(12) United States Patent
Rosenberg et al.

(10) Patent No.: US 9,785,272 B1
(45) Date of Patent: Oct. 10, 2017

(54) TOUCH DISTINCTION

(75) Inventors: Ilya D. Rosenberg, Mountain View, CA (US); Julien G. Beguin, San Francisco, CA (US); Tomer Moscovich, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 12/846,368

(22) Filed: Jul. 29, 2010

Related U.S. Application Data

(60) Provisional application No. 61/230,592, filed on Jul. 31, 2009, provisional application No. 61/263,015, filed on Nov. 20, 2009.

(51) Int. Cl.
*G06F 3/041* (2006.01)

(52) U.S. Cl.
CPC .................................. *G06F 3/0414* (2013.01)

(58) Field of Classification Search
CPC .......... G06F 3/041; G06F 15/00; G06F 13/00; G06F 3/033
See application file for complete search history.

(56) References Cited

U.S. PATENT DOCUMENTS

| | | |
|---|---|---|
| 3,944,740 A | 3/1976 | Murase et al. |
| 4,526,043 A | 7/1985 | Boie et al. |
| 4,587,378 A | 5/1986 | Moore |
| 4,952,031 A | 8/1990 | Tsunoda et al. |
| 4,983,786 A | 1/1991 | Stevens et al. |
| 5,105,548 A | 4/1992 | Fowler |
| 5,543,589 A | 8/1996 | Buchana et al. |
| 5,597,183 A | 1/1997 | Johnson |
| 5,666,113 A | 9/1997 | Logan |
| 5,761,485 A | 6/1998 | Munyan |
| 5,818,430 A | 10/1998 | Heiser |
| 5,825,352 A | 10/1998 | Bisset et al. |
| 5,847,698 A | 12/1998 | Reavey et al. |
| 6,029,214 A * | 2/2000 | Dorfman ............. G06F 3/03545 345/173 |
| 6,072,474 A | 6/2000 | Morimura et al. |
| 6,128,007 A | 10/2000 | Seybold |
| 6,229,502 B1 | 5/2001 | Schwab |

(Continued)

FOREIGN PATENT DOCUMENTS

| | | |
|---|---|---|
| JP | 09282100 | 10/2007 |
| WO | WO2007/141566 A2 | 12/2007 |

(Continued)

OTHER PUBLICATIONS

Moscovich, et al., "Multi-finger Cursor Techniques", Department of Computer Science, Brown University, Year of Publication: 2006, 7 pages.

(Continued)

*Primary Examiner* — Bryan Earles
(74) *Attorney, Agent, or Firm* — Lee & Hayes, PLLC

(57) ABSTRACT

A force sensitive touch sensor is configured to distinguish objects touching the surface based on a touch profile. Magnetometers detect the presence, location, orientation, and angle of a stylus comprising a magnet. Presence of the magnetic field in conjunction with touches on the force sensitive touch sensor provides additional comparisons to distinguish whether a touch is from a human hand, a particular portion of a stylus, or other object.

23 Claims, 28 Drawing Sheets

(56) References Cited

U.S. PATENT DOCUMENTS

| | | | |
|---|---|---|---|
| 6,392,636 B1 | 5/2002 | Ferrari et al. | |
| 6,594,606 B2 | 7/2003 | Everitt | |
| 6,707,438 B1 | 3/2004 | Ishizuka et al. | |
| 6,762,752 B2 | 7/2004 | Perski et al. | |
| 6,980,202 B2 | 12/2005 | Carro | |
| 6,982,699 B1 | 1/2006 | Lenssen et al. | |
| 7,123,243 B2 | 10/2006 | Kawasaki et al. | |
| 7,166,966 B2 | 1/2007 | Naugler, Jr. et al. | |
| 7,190,348 B2 | 3/2007 | Kennedy et al. | |
| 7,199,322 B2 | 4/2007 | Bourdelais et al. | |
| 7,324,093 B1 | 1/2008 | Gettemy et al. | |
| 7,331,245 B2 * | 2/2008 | Nishimura | G06F 3/0414 73/818 |
| 7,339,577 B2 | 3/2008 | Sato et al. | |
| 7,471,284 B2 | 12/2008 | Bathiche et al. | |
| 7,619,616 B2 | 11/2009 | Rimas Ribikauskas et al. | |
| 7,760,187 B2 | 7/2010 | Kennedy | |
| 7,800,586 B2 | 9/2010 | Serban et al. | |
| 7,825,905 B2 | 11/2010 | Philipp | |
| 8,089,470 B1 | 1/2012 | Schediwy et al. | |
| 8,223,278 B2 | 7/2012 | Kim et al. | |
| 8,243,424 B1 | 8/2012 | Babu et al. | |
| 8,265,717 B2 | 9/2012 | Gorsica et al. | |
| 8,316,324 B2 | 11/2012 | Boillot | |
| 8,427,424 B2 | 4/2013 | Hartmann et al. | |
| 8,466,880 B2 | 6/2013 | Westerman et al. | |
| 8,558,767 B2 | 10/2013 | Kwon | |
| 8,902,174 B1 * | 12/2014 | Peterson | G06F 3/0416 178/18.03 |
| 8,947,351 B1 | 2/2015 | Noble | |
| 9,069,417 B2 * | 6/2015 | Rimon | G06F 3/038 |
| 9,244,562 B1 | 1/2016 | Rosenberg et al. | |
| 2001/0013855 A1 | 8/2001 | Fricker et al. | |
| 2002/0015024 A1 * | 2/2002 | Westerman et al. | 345/173 |
| 2002/0080123 A1 * | 6/2002 | Kennedy et al. | 345/173 |
| 2002/0109668 A1 | 8/2002 | Rosenberg et al. | |
| 2002/0149572 A1 | 10/2002 | Schulz et al. | |
| 2002/0180714 A1 | 12/2002 | Duret | |
| 2003/0067449 A1 | 4/2003 | Yoshikawa et al. | |
| 2003/0095115 A1 | 5/2003 | Brian et al. | |
| 2003/0156098 A1 | 8/2003 | Shaw et al. | |
| 2003/0210235 A1 * | 11/2003 | Roberts | 345/173 |
| 2003/0234768 A1 | 12/2003 | Rekimoto et al. | |
| 2004/0125087 A1 | 7/2004 | Taylor et al. | |
| 2004/0174324 A1 | 9/2004 | Yamazaki et al. | |
| 2005/0083316 A1 | 4/2005 | Brian et al. | |
| 2005/0162402 A1 | 7/2005 | Watanachote | |
| 2005/0174336 A1 | 8/2005 | Nakayama et al. | |
| 2005/0200798 A1 | 9/2005 | Tanaka | |
| 2005/0259087 A1 | 11/2005 | Hoshino et al. | |
| 2006/0007172 A1 * | 1/2006 | Baker | G01L 1/205 345/173 |
| 2006/0007182 A1 * | 1/2006 | Sato | G06F 3/0416 345/173 |
| 2006/0012580 A1 | 1/2006 | Perski et al. | |
| 2006/0012581 A1 * | 1/2006 | Haim | G06F 3/046 345/173 |
| 2006/0028459 A1 | 2/2006 | Underwood et al. | |
| 2006/0050062 A1 | 3/2006 | Ozawa et al. | |
| 2006/0097991 A1 | 5/2006 | Hotelling et al. | |
| 2006/0109252 A1 | 5/2006 | Kolmykov-Zotov et al. | |
| 2006/0192726 A1 | 8/2006 | Huitema et al. | |
| 2006/0198080 A1 | 9/2006 | Hawes et al. | |
| 2006/0209045 A1 | 9/2006 | Su et al. | |
| 2006/0236263 A1 | 10/2006 | Bathiche et al. | |
| 2006/0244735 A1 | 11/2006 | Wilson | |
| 2006/0293864 A1 * | 12/2006 | Soss | 702/104 |
| 2007/0128948 A1 | 6/2007 | Nakanishi et al. | |
| 2007/0152976 A1 * | 7/2007 | Townsend et al. | 345/173 |
| 2007/0235231 A1 * | 10/2007 | Loomis et al. | 178/18.06 |
| 2007/0236618 A1 | 10/2007 | Maag et al. | |
| 2008/0018608 A1 | 1/2008 | Serban et al. | |
| 2008/0018611 A1 | 1/2008 | Serban et al. | |
| 2008/0030464 A1 | 2/2008 | Sohm et al. | |
| 2008/0053293 A1 | 3/2008 | Georges et al. | |
| 2008/0074400 A1 | 3/2008 | Gettemy et al. | |
| 2008/0143679 A1 | 6/2008 | Harmon et al. | |
| 2008/0158183 A1 | 7/2008 | Hotelling et al. | |
| 2008/0160656 A1 | 7/2008 | Chanda et al. | |
| 2008/0168403 A1 * | 7/2008 | Westerman et al. | 715/863 |
| 2008/0180406 A1 | 7/2008 | Han et al. | |
| 2008/0204426 A1 * | 8/2008 | Hotelling | G06F 3/0418 345/173 |
| 2008/0211796 A1 | 9/2008 | Kim | |
| 2008/0246723 A1 | 10/2008 | Baumbach | |
| 2008/0254822 A1 * | 10/2008 | Tilley | 455/550.1 |
| 2008/0296073 A1 | 12/2008 | McDermid | |
| 2008/0303799 A1 | 12/2008 | Schwesig et al. | |
| 2008/0309631 A1 * | 12/2008 | Westerman | G06F 1/3203 345/173 |
| 2009/0095540 A1 | 4/2009 | Zachut et al. | |
| 2009/0102805 A1 | 4/2009 | Meijer et al. | |
| 2009/0120696 A1 | 5/2009 | Hayakawa et al. | |
| 2009/0141008 A1 * | 6/2009 | Johnson | G06F 3/0416 345/179 |
| 2009/0165296 A1 | 7/2009 | Carmi | |
| 2009/0174679 A1 * | 7/2009 | Westerman | 345/173 |
| 2009/0218310 A1 | 9/2009 | Zu et al. | |
| 2009/0219258 A1 | 9/2009 | Geaghan et al. | |
| 2009/0227295 A1 | 9/2009 | Kim | |
| 2009/0237371 A1 | 9/2009 | Kim et al. | |
| 2009/0237374 A1 | 9/2009 | Li et al. | |
| 2009/0249236 A1 * | 10/2009 | Westerman | G06F 3/0235 715/765 |
| 2009/0256817 A1 | 10/2009 | Perlin et al. | |
| 2009/0289914 A1 | 11/2009 | Cho | |
| 2009/0309616 A1 | 12/2009 | Klinghult et al. | |
| 2009/0315848 A1 | 12/2009 | Ku et al. | |
| 2010/0005427 A1 | 1/2010 | Zhang et al. | |
| 2010/0006350 A1 | 1/2010 | Elias | |
| 2010/0013780 A1 | 1/2010 | Ikeda et al. | |
| 2010/0013797 A1 | 1/2010 | Kim et al. | |
| 2010/0020043 A1 | 1/2010 | Park et al. | |
| 2010/0026647 A1 | 2/2010 | Abe et al. | |
| 2010/0039395 A1 | 2/2010 | Nurmi et al. | |
| 2010/0056277 A1 | 3/2010 | Marks et al. | |
| 2010/0090964 A1 | 4/2010 | Soo et al. | |
| 2010/0117974 A1 | 5/2010 | Joguet et al. | |
| 2010/0123670 A1 | 5/2010 | Philipp | |
| 2010/0139990 A1 | 6/2010 | Westerman et al. | 178/18.03 |
| 2010/0156805 A1 * | 6/2010 | Brand | G06F 3/044 345/173 |
| 2010/0182285 A1 | 7/2010 | Tremblay | |
| 2010/0199221 A1 | 8/2010 | Yeung et al. | |
| 2010/0225604 A1 * | 9/2010 | Homma | G06F 3/0414 345/173 |
| 2010/0267421 A1 | 10/2010 | Rofougaran | |
| 2010/0277439 A1 | 11/2010 | Charlier et al. | |
| 2010/0295780 A1 | 11/2010 | Vaisanen et al. | |
| 2010/0295781 A1 | 11/2010 | Alameh et al. | |
| 2011/0007021 A1 | 1/2011 | Bernstein et al. | |
| 2011/0025619 A1 * | 2/2011 | Joguet | G06F 1/3262 345/173 |
| 2011/0037709 A1 * | 2/2011 | Cottarel et al. | 345/173 |
| 2011/0061947 A1 * | 3/2011 | Krah et al. | 178/18.01 |
| 2011/0074701 A1 * | 3/2011 | Dickinson | G06F 3/041 345/173 |
| 2011/0096033 A1 | 4/2011 | Ko | |
| 2011/0109577 A1 | 5/2011 | Lee et al. | |
| 2011/0141009 A1 | 6/2011 | Izumi | |
| 2011/0163992 A1 | 7/2011 | Cordeiro et al. | |
| 2011/0242037 A1 | 10/2011 | Gruber | |
| 2011/0254864 A1 | 10/2011 | Tsuchikawa et al. | |
| 2011/0267265 A1 | 11/2011 | Stinson | |
| 2011/0267280 A1 * | 11/2011 | De Mers | G06F 3/04886 345/173 |
| 2011/0285657 A1 | 11/2011 | Shimotani et al. | |
| 2012/0050181 A1 | 3/2012 | King et al. | |
| 2012/0057064 A1 | 3/2012 | Gardiner et al. | |
| 2012/0084691 A1 | 4/2012 | Yun | |
| 2012/0105324 A1 | 5/2012 | Lee et al. | |
| 2012/0173067 A1 | 7/2012 | Szczerba et al. | |

(56) References Cited

U.S. PATENT DOCUMENTS

| | | |
|---|---|---|
| 2012/0174004 A1 | 7/2012 | Seder et al. |
| 2012/0206333 A1 | 8/2012 | Kim |
| 2012/0299848 A1 | 11/2012 | Homma et al. |
| 2012/0299849 A1 | 11/2012 | Homma et al. |
| 2012/0313880 A1 | 12/2012 | Geaghan et al. |
| 2012/0320247 A1 | 12/2012 | Kim et al. |
| 2012/0326994 A1 | 12/2012 | Miyazawa et al. |
| 2013/0002551 A1 | 1/2013 | Imoto et al. |
| 2014/0028557 A1 | 1/2014 | Otake et al. |
| 2014/0085202 A1 | 3/2014 | Hamalainen et al. |
| 2014/0267176 A1 | 9/2014 | Bathiche et al. |
| 2014/0285418 A1 | 9/2014 | Adachi |
| 2015/0109257 A1 | 4/2015 | Jalali |

FOREIGN PATENT DOCUMENTS

| | | |
|---|---|---|
| WO | WO2009/008568 A1 | 1/2009 |
| WO | WO2009/021836 A1 | 2/2009 |

OTHER PUBLICATIONS

Ashbrook, et al., "Nenya: Subtle and Eyes-Free Mobile Input with a Magnetically-Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009). UIST '09. ACM, New York, NY, 4 pages.

Non-Final Office Action for U.S. Appl. No. 12/846,497, mailed on Dec. 14, 2012, Ilya D. Rosenberg et al., "Capacitive Sensing with Interpolating Force-Sensitive Resistor Array", 26 pages.

Office action for U.S. Appl. No. 12/846,328, mailed on Dec. 24, 2012, Rosenberg et al., "Two-Sided Touch Sensor", 15 pages.

Non-Final Office Action for U.S. Appl. 13/247,669, mailed on Feb. 1, 2013, Julien G. Beguin et al., "Interacting Through Noncontact Gestures", 22 pages.

Office Action for U.S. Appl. No. 12/846,539, mailed on Feb. 15, 2013, Ilya D. Rosenberg et al., "Magnetic Touch Discrimination", 20 pages.

Office action for U.S. Appl. No. 12/846,519, mailed on Apr. 24, 2013, Rosenberg et al., "Touch Sensing Techniques", 23 pages.

Office action for U.S. Appl. No. 12/846,497, mailed on Apr. 25, 2013, Rosenberg et al., "Capacitive Sensing with Interpolating Force-Sensitive Resistor Array", 27 pages.

Office action for U.S. Appl. No. 12/846,268, mailed on May 3, 2013, Rosenberg et al., "Gestures and Touches on Force-sensitive Input Devices", 15 pages.

Office action for U.S. Appl. No. 12/846,295, mailed on May 21, 2013, Rosenberg et al., "Visually Consistent Arrays", 14 pages.

Office action for U.S. Appl. No. 13/247,699, mailed on Jul. 19, 2013, Beguin et al., "Interacting Through Noncontact Gestures", 32 pages.

Final Office Action for U.S. Appl. No. 12/846,539, mailed on Oct. 25, 2013, Ilya D. Rosenberg, "Magnetic Touch Discrimination", 26 pages.

Office Action for U.S. Appl. No. 12/846,268, mailed on Oct. 23, 2013, Ilya D. Rosenberg, "Gestures and Touches on Force-sensitive Input Devices", 37 pages.

Office Action for U.S. Appl. No. 12/846,428, mailed on Oct. 9, 2013, Ilya D. Rosenberg, "Hardware Enabled Interpolating Sensor and Display", 25 pages.

Office action for U.S. Appl. No. 12/846,519, mailed on Nov. 14, 2013, Rosenberg, et al., "Touch Sensing Techniques", 24 pages.

Office action for U.S. Appl. No. 12/846,328, mailed on Aug. 15, 2013, Rosenberg et al., "Two-Sided Touch Sensor", 18 pages.

Wolf, et al., "Angles, Azimuths, and Bearings", Pearson Prentice Hall, Elementary Surveying, 12th Edition, 2008, Chapter 7, pp. 165-184.

Final Office Action for U.S. Appl. No. 12/846,295, mailed on Dec. 23, 2013, Ilya D. Rosenberg, "Visually Consistent Arrays including Conductive Mesh", 16 pages.

Office Action for U.S. Appl. No. 13/247,699, mailed on Jan. 31, 2014, Julien G. Beguin, "Interacting Through Noncontact Gestures", 28 pages.

Office Action for U.S. Appl. No. 12/846,328, mailed on Dec. 19, 2013, Ilya D. Rosenberg, "Two-Sided Touch Sensor", 13 pages.

Office action for U.S. Appl. No. 12/846,428, mailed on Feb. 21, 2014, Rosenberg, et al., "Hardware Enabled Interpolating Sensor and Display", 30 pages.

Office Action for U.S. Appl. No. 12/846,497, mailed on Oct. 23, 2014, Ilya D. Rosenberg, "Capacitive Sensing with Interpolating Force-Sensitive Resistor Array", 25 pages.

Office Action for U.S. Appl. No. 12/846,268, mailed on Jul. 29, 2010, Ilya D. Rosenberg, "Gestures and Touches on Force-sensitive Input Devices", 32 pages.

Office Action for U.S. Appl. No. 12/846,428, mailed on Aug. 21, 2014, Ilya D. Rosenberg, "Hardware Enabled Interpolating Sensor and Display", 24 pages.

Office action for U.S. Appl. No. 12/846,295, mailed on Sep. 24, 2014, Rosenberg et al., "Visually Consistent Arrays including Conductive Mesh", 17 pages.

Final Office Action for U.S. Appl. No. 13/247,699, mailed on Sep. 26, 2014, Julien G. Beguin, "Interacting Through Noncontact Gestures", 30 pages.

Final Office Action for U.S. Appl. No. 12/846,428, mailed on Dec. 1, 2014, Ilya D. Rosenberg, "Hardware Enabled Interpolating Sensor and Display", 26 pages.

Office Action for U.S. Appl. No. 12/846,268, mailed on Dec. 22, 2014, Ilya D. Rosenberg, "Gestures and Touches on Force-sensitive Input Devices", 36 pages.

Office Action for U.S. Appl. No. 12/846,539, mailed on Feb. 24, 2015, Ilya D. Rosenberg, "Magnetic Touch Discrimination", 17 pages.

Final Office Action for U.S. Appl. No. 12/846,368, mailed on Feb. 27, 2015, Ilya D. Rosenbert, "Touch Distinction", 49 pages.

Office Action for U.S. Appl. No. 12/846,519, mailed on Mar. 11, 2015, Ilya D. Rosenberg, "Touch Sensing Techniques", 35 pages.

Final Office Action for U.S. Appl. No. 12/846,497, mailed on Mar. 20, 2015, Ilya D. Rosenberg, "Capacitive Sensing with Interpolating Force-Sensitive Resistor Array", 37 pages.

Final Office Action for U.S. Appl. No. 12/846,268, mailed on Apr. 2, 2015, Ilya D. Rosenberg, "Gestures and Touches on Force-sensitive Input Devices", 37 pages.

Final Office Action for U.S. Appl. No. 12/846,368, mailed on Feb. 27, 2015, Ilya D. Rosenbert, "Touch Distinction," 49 pages.

Office action for U.S. Appl. No. 12/846,519 mailed on Nov. 18, 2015, Rosenberg et al., "Touch Sensing Techniques," 36 pages.

Office action for U.S. Appl. No. 13/247,699, mailed on Aug. 27, 2015, Beguin et al., "Interacting Through Noncontact Gestures," 24 pages.

Office action for U.S. Appl. No. 15/003,086, mailed on Dec. 15, 2016, Rosenberg et al., "Gestures and Touches on Force-sensitive Input Devices", 23 pages.

Office Action for U.S. Appl. No. 12/846,497, mailed on Dec. 22, 2016, Rosenberg et al., "Capacitive Sensing with Interpolating Force-Sensitive Resistor Array", 43 pages.

Office Action for U.S. Appl. No. 12/846,497, mailed on Mar. 15, 2016, Rosenberg et al., "Capacitive Sensing with Interpolating Force-Sensitive Resistor Array", 37 pages.

Office action for U.S. Appl. No. 13/247,699, mailed on Mar. 24, 2016, Beguin et al., "Interacting Through Noncontact Gestures", 25 pages.

Office action for U.S. Appl. No. 15/003,086, mailed on Jun. 17, 2016, Rosenberg et al., "Gestures and Touches on Force-sensitive Input Devices", 11 pages.

Office Action for U.S. Appl. No. 12/846,497, mailed on Sep. 23, 2016, Rosenberg et al., "Capacitive Sensing with Interpolating Force-Sensitive Resistor Array", 43 pages.

* cited by examiner

TOUCH DISTINCTION

PRIORITY

The present application claims priority to U.S. Provisional Application Ser. No. 61/230,592, filed on Jul. 31, 2009, entitled "Inventions Related to Touch Screen Technology" and U.S. Provisional Application Ser. No. 61/263,015, filed on Nov. 20, 2009, entitled "Device and Method for Distinguishing a Pen or Stylus Contact from the Contact of a Finger or other Object Using Magnetic Sensing." These pending applications are hereby incorporated by reference in their entirety, and the benefit of the filing dates of these pending applications are claimed to the fullest extent permitted.

BACKGROUND

Electronic devices that accept input from users are ubiquitous, and include cellular phones, eBook readers, tablet computers, desktop computers, portable media devices, and so forth. Increasingly, users desire these devices to accept input without the use of traditional keyboards or mice.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
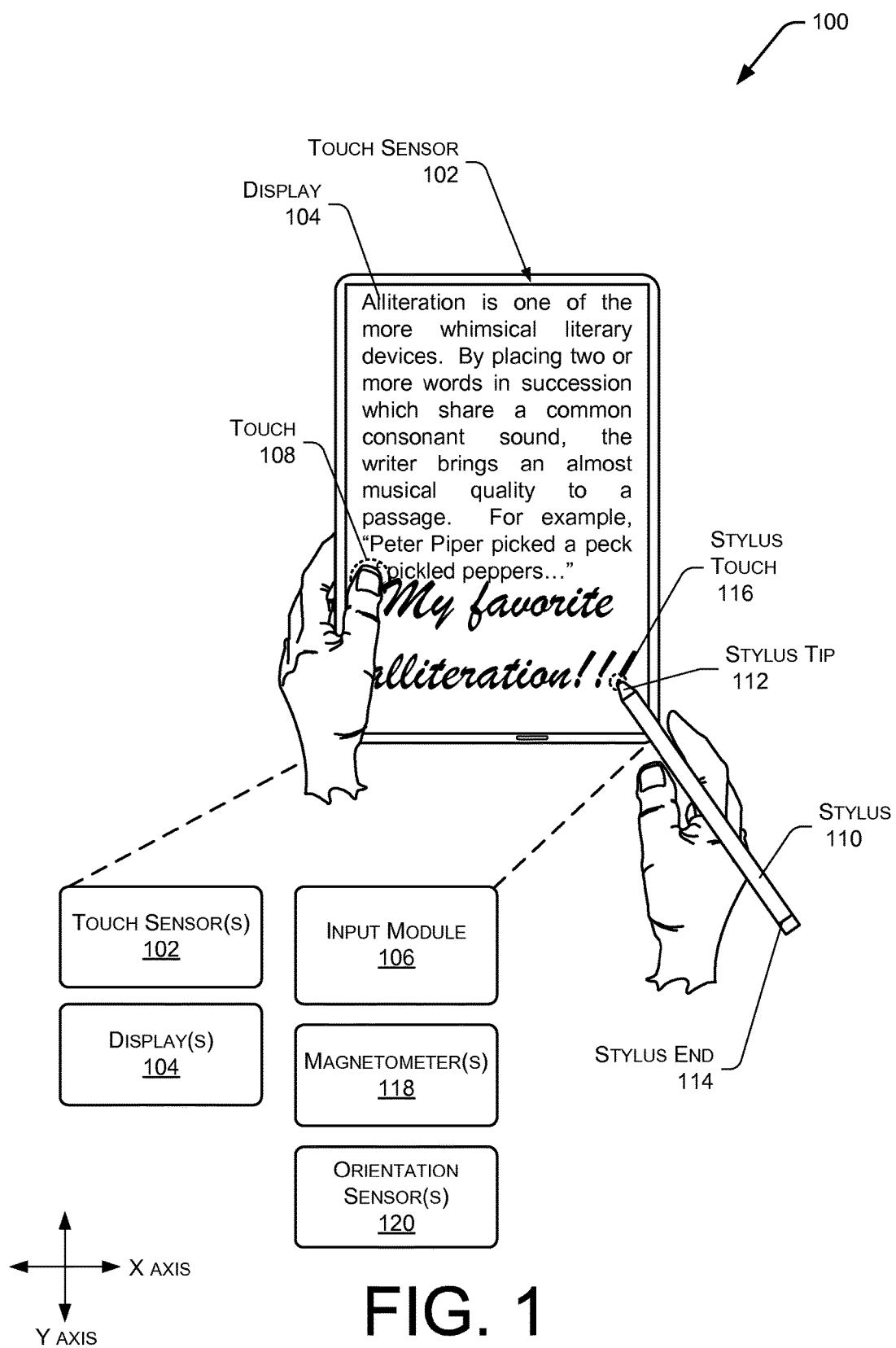
FIG. 1 depicts an electronic device configured to accept input from devices including a touch sensor and a magnetometer.

Described herein are devices and techniques for distinguishing and characterizing touches upon a touch sensor. The touch sensor generates output corresponding to one or more touches at points on the touch sensor. The output from the touch sensors may be used to generate a touch profile. Touch profiles may comprise several characteristics such as area, magnitude of applied force, linear force distribution, temporal force distribution, location or distribution of the force, variation over time, duration, and so forth.

With sufficient numbers of sensing elements, or "sensels," and resulting data, the touch profiles allow for distinction between different objects and characterization of those objects. For example, with sufficient force per unit area resolution, the relatively narrow tip of a stylus may be distinguished from a relatively blunt fingertip, even where the two exert the same overall force on the touch sensor.

Force sensing touch sensors also allow distinguishing intentional and unintentional touches by assessing the touch profile. For example, the linear force distribution of the touch profile of a user resting a portion of their hand on the touch sensor differs from a finger pressing a particular spot on the touch sensor.

Where an object in contact with the force sensitive touch sensor either contacts the touch sensor at a sensel amidst a plurality of sensels, or moves over a sensel, the resulting touch profile allows for the shape of different objects, or at least the portion in contact with the touch sensor, to be distinguished. For example, the relatively narrow tip of the stylus produces an abrupt spike in both a spatial and a temporal force distribution of the touch profile as compared to the relatively blunt tip of the finger.

Characterization of prior touches may be used to characterize future touches within a specific area on the touch sensor. For example, within an area in which the input was determined to be from a stylus, subsequent input in that area may be biased in favor of being characterized as from a stylus. This biasing to characterize the additional touches made within the area may vary over time. In some implementations, over a pre-determined period of time the biasing may decrease. This persistence of characterization provides rapid characterization and improves responsiveness to the user. In one example, such persistence allows for easy entry of diacritical marks while the user is handwriting on the touch sensor. By persisting the characterization of a stylus as a stylus, the user is able to enter the dot atop a lowercase "i" or a horizontal bar through a body of a lowercase "t" without requiring modification of writing style or other input behaviors.

To further facilitate characterization of touches, larger portions or regions of the touch sensor may be designated. Touches within these regions are biased more heavily in favor of a particular characterization associated with the region. Regions may be determined based on history of user input, orientation of content on a display in relation to the touch sensor, and so forth. For example, a perimeter or border of the touch sensor may be designated a first region. Within this first region, touches are most likely finger touches and may further be biased to be considered holding touches or associated with a particular subset of gestures. Meanwhile, touches in a second region which is surrounded by the first region may be characterized as most likely stylus touches associated with controls or handwriting.

While using a force sensitive touch sensor, the magnitude of the force may be a factor for generating output. For example, a harder touch may result in a change to the output. However, maintaining a constant force while the touch moves is difficult for some users due to varying geometries, biomechanical factors, and so forth. As a result, to avoid erroneous inputs during motion of a touch on the force sensitive touch sensor, the input may be modified. In some instances, this modification may include de-rating or de-emphasizing the force input. Thus, the user may have to push harder while the touch is moving to affect the same change compared to a lesser push while the touch is stationary. In some instances, force input may be disregarded altogether during motion of the touch. In some implementations, during movement, an overall touch detection threshold may be decreased during movement, improving tracking of the touch during motion.

Touch sensors are used in a variety of devices ranging from handheld e-book reader devices to graphics tablets on desktop computers. Users interact with the devices in a variety of ways and in many different physical environments and orientations. Part of the user's palm may rest on the touch sensor, or the user may grip a portion of the touch sensor to hold the device, such as in a portable device where the surface area of the touch sensor predominates. These holding touches may be detected and prevented from generating erroneous output.

The holding touches may be recognized by their distinctive touch profile. In one implementation, a touch which maintains about the same contact area for a pre-determined time interval and exerts a relatively constant force may be categorized as a holding touch. Once characterized, input received from that area may be de-emphasized or disregarded while the holding touch is in progress. Once the holding touch releases, input from the area of the holding touch may be re-emphasized. In some implementations, this re-emphasis may occur over a pre-determined time interval. For example, a user may be holding a touch sensor and generating a holding touch. By re-emphasizing over a period of time, the user may shift their hands for a moment, and reassert the holding touch without generating erroneous input. Additionally, a history of touch profiles for touches determined to be holding touches or which result from a training phase may also be used to distinguish the holding touches.

Reducing power consumption in electronic devices offers several benefits such as extending battery life in portable devices, thermal management, and so forth. Touch sensors consume power while operational. In many implementations, touch sensors and/or associated components may be operated with different parameters. These parameters may include scan rate, scan area, and so forth. These parameters may directly affect the amount of power consumed. For example, when maximum responsiveness to user input is called for, the scan rate and scan resolution may be configured accordingly, resulting in significant power consumption. In many devices, users seldom constantly input data and seldom use all available areas on the touch sensor simultaneously. Thus, it is possible to alter parameters to reduce power consumption.

By monitoring the touch profiles and comparing changes to one or more pre-determined thresholds, it is possible to dynamically change the operational mode of the touch sensor and/or associated components. When a touch is determined to be a quiescent touch, or no touches are present, the touch sensor and/or associated components such as a touch controller may be placed into a lower power mode. For example, consider an eBook reader device with a touch sensitive screen. While the user is reading the user's rate of touch input drops because they are focused on reading. Holding touches may remain, but no active touches are present. The touch sensor may then be placed into a lower power mode.

In one implementation, this low power mode may comprise a decrease in the scan rate of the touch sensor, change in which parts of the touch sensor are being scanned, alteration in scan resolution, and so forth. When the user starts to touch the screen, such as to when handwriting a comment or selecting a command, the touch sensor resumes a more wakeful mode, such as normal power mode.

Furthermore, there may be different operational modes depending upon the characterization of the touch. For example, where the touches comprise handwriting input via the stylus, the touch sensor may be configured to operate in the highest scan rate with best resolution to capture the detailed input from the user. Where the input is less precise, such as selection of user controls or finger based input, the scan rate and resolution may be set to an intermediate value configured to provide adequate input.

In addition to fingers, users may wish to use implements such as styli, pucks, tokens, and so forth in conjunction with touch and near-touch sensors. These implements may incorporate magnets suitable to work in conjunction with the magnetic field sensors. For ease of description, these implements are referred to as "magnetic implements." However it is understood that the implement incorporates at least one magnet, but need not be entirely magnetic. These implements thus incorporate a magnet which, when used in conjunction with magnetic field sensors coupled to the device, provides for additional functionality and features.

The magnetic field sensors, such as a magnetometer, allow for the detection and characterization of an impinging magnetic field. For example, a magnetometer may allow for determining a field strength, angular bearing, polarity of the magnetic field, and so forth. In some implementations, the magnetometer may comprise a Hall-effect device. Magnetic fields, particularly in the environment within which electronic devices operate, are predictable and well understood. As a result, it becomes possible to use one or more magnetometers to determine presence and in some implementations the position, orientation, and so forth of the magnetic implement.

Touches are distinguishable based on the presence or absence of the magnetic field. For example, when no magnetic field meeting pre-defined criteria is present, a touch may be determined to be a finger touch in contrast to when the magnetic field having the pre-defined criteria is present which determines the touch to be a magnetic implement such as a stylus. In another example, which end of a stylus is touching the touch sensor is distinguishable independent of the touch profile based on the polarity of the magnetic field detected. These pre-defined criteria of the magnetic field may include field strength, direction, and so forth.

Additionally, by using the position information of magnetic implements, near-touch sensing is possible. For example, movement of the stylus or other magnetic implement proximate to the magnetometer but not in contact with the touch sensor may still provide input.

Illustrative Device

FIG. 1 depicts an electronic device 100 configured with a touch sensor, magnetometer, and other sensors. A touch sensor 102 accepts input resulting from contact and/or application of incident force, such as a user finger or stylus pressing upon the touch sensor. While the touch sensor 102 is depicted on the front of the device, it is understood that other touch sensors 102 may be disposed along the other sides of the device instead of, or in addition to, the touch sensor on the front. A display 104 is configured to present information to the user. In some implementations, the display 104 and the touch sensor 102 may be combined to provide a touch-sensitive display, or touchscreen display.

Within or coupled to the device, an input module 106 accepts input from the touch sensor 102 and other sensors. For example, as depicted here with a broken line is a user touch 108 on the touch sensor 102. Also depicted is a stylus 110 having two opposing terminal structures, a stylus tip 112 and a stylus end 114. The stylus tip 112 is shown in contact with the touch sensor 102 as indicated by the stylus touch 116.

Returning to the sensors within the device 100, one or more magnetometers 118 are accessible to the input module 106. These magnetometers are configured to detect and in some implementations characterize impinging magnetic fields. One or more orientation sensors 120 such as accelerometers, gravimeters, and so forth may also be present. These sensors are discussed in more detail next with regards to FIG. 2.

Figure 2:
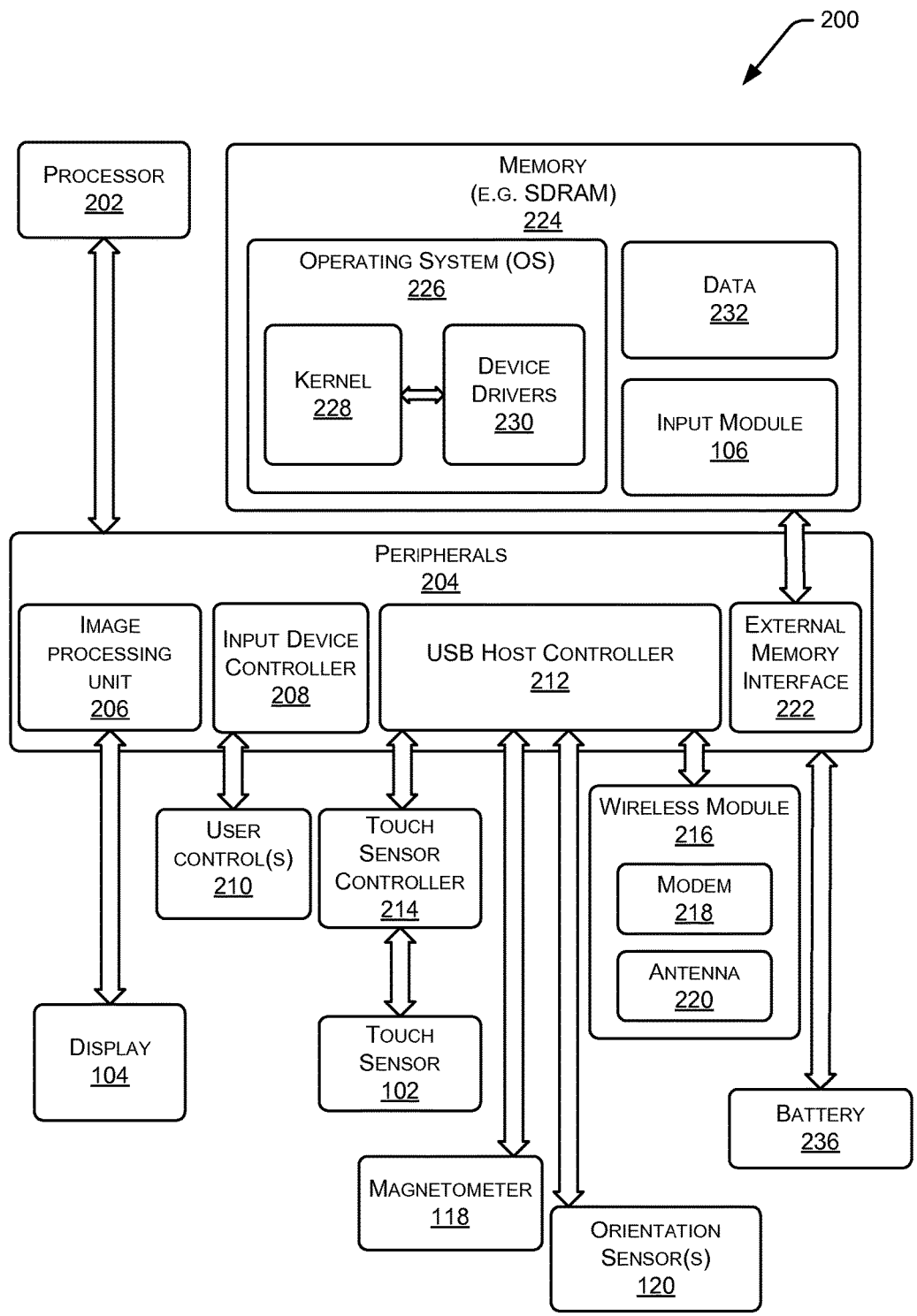
FIG. 2 is an illustrative schematic of the electronic device with an input module configured to use the touch sensor, the magnetometer, or both to accept user input.

FIG. 2 is an illustrative schematic 200 of the electronic device 100 of FIG. 1. In a very basic configuration, the device 100 includes components such as a processor 202 and one or more peripherals 204 coupled to the processor 202. Each processor 202 may itself comprise one or more processors.

An image processing unit 206 is shown coupled to one or more display components 104 (or "displays"). In some implementations, multiple displays may be present and coupled to the image processing unit 206. These multiple displays may be located in the same or different enclosures or panels. Furthermore, one or more image processing units 206 may couple to the multiple displays.

The display 104 may present content in a human-readable format to a user. The display 104 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

For convenience only, the display 104 is shown in FIG. 1 in a generally rectangular configuration. However, it is understood that the display 104 may be implemented in any shape, and may have any ratio of height to width. Also, for stylistic or design purposes, the display 104 may be curved or otherwise non-linearly shaped. Furthermore the display 104 may be flexible and configured to fold or roll.

The content presented on the display 104 may take the form of electronic books or "eBooks." For example, the display 104 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 may have an input device controller 208 configured to accept input from a keypad, keyboard, or other user actuable controls 210. These user actuable controls 210 may have dedicated or assignable operations. For instance, the actuable controls may include page turning buttons, a navigational keys, a power on/off button, selection keys, joystick, touchpad, and so on.

The device 100 may also include a USB host controller 212. The USB host controller 212 manages communications between devices attached to a universal serial bus ("USB") and the processor 202 and other peripherals.

FIG. 2 further illustrates that the device 100 includes a touch sensor controller 214. The touch sensor controller 214 couples to the processor 202 via the USB host controller 212 (as shown). In other implementations, the touch sensor controller 214 may couple to the processor via the input device controller 208, inter-integrated circuit ("I²C"), universal asynchronous receiver/transmitter ("UART"), or serial peripheral interface bus ("SPI"), or other interfaces. The touch sensor controller 214 couples to the touch sensor 102. In some implementations multiple touch sensors 102 may be present.

The touch sensor 102 may comprise various technologies including interpolating force-sensing resistance (IFSR) sensors, capacitive, magnetic, force sensitive resistors, acoustic, optical, and so forth. The touch sensor 102 may be configured such that user input through contact or gesturing relative to the device 100 may be received.

The touch sensor controller 214 is configured to determine characteristics of interaction with the touch sensor. These characteristics may include the location of the touch on the touch sensor, magnitude of the force, shape of the touch, and so forth. In some implementations, the touch sensor controller 214 may provide some or all of the functionality provided by the input module 106, described below.

The magnetometer 118 may be coupled to the USB host controller 212, or another interface. The magnetometer 118, allows for the detection and characterization of an impinging magnetic field. For example, the magnetometer 118 may be configured to determine a field strength, angular bearing, polarity of the magnetic field, and so forth. In some implementations, the magnetometer may comprise a Hall-effect device. Magnetic fields, particularly in the environment within which electronic devices operate, are predictable and well understood. As a result, it becomes possible to use one or more magnetometers to determine presence and in some implementations the position, orientation, and so forth of the magnetic implement. A plurality of magnetometers 118 may be used in some implementations.

One or more orientation sensors 120 may also be coupled to the USB host controller 212, or another interface. The orientation sensors 120 may include accelerometers, gravimeters, gyroscopes, proximity sensors, and so forth. Data from the orientation sensors 120 may be used at least in part to determine the orientation of the user relative to the device 100. Once an orientation is determined, input received by the device may be adjusted to account for the user's position. For example, as discussed below with regards to FIG. 13, when the user is holding the device in a portrait orientation the left and right edges of the touch sensor the input module 106 designates these areas as likely holding touch areas. Thus, touches within those areas biased in favor of being categorized as holding touches, rather than input touches.

The USB host controller 212 may also couple to a wireless module 216 via the universal serial bus. The wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, the device 100 may include a wired network interface.

The device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 224 may store an operating system 226 comprising a kernel 228 operatively coupled to one or more device drivers 230. The device drivers 230 are also operatively coupled to peripherals 204, such as the touch sensor controller 214. The external memory 224 may also store data 232, which may comprise content objects for consumption on eBook reader device 100, executable programs, databases, user settings, configuration files, device status, and so forth. Executable instructions comprising an input module 106 may also be stored in the memory 224. The input module 106 is configured to receive data from the touch sensor controller 214 and generate input strings or commands. In some implementations, the touch sensor controller 214, the operating system 226, the kernel 228, one or more of the device drivers 230, and so forth, may perform some or all of the functions of the input module 106.

One or more batteries 236 provide operational electrical power to components of the device 100 for operation when the device is disconnected from an external power supply. The device 100 may also include one or more other, non-illustrated peripherals, such as a hard drive using magnetic, optical, or solid state storage to store information, a firewire bus, a Bluetooth™ wireless network interface, camera, global positioning system, PC Card component, and so forth.

Couplings, such as that between the touch sensor controller 214 and the USB host controller 212, are shown for emphasis. There are couplings between many of the components illustrated in FIG. 2, but graphical arrows are omitted for clarity of illustration.

Illustrative Hand

Figure 3:
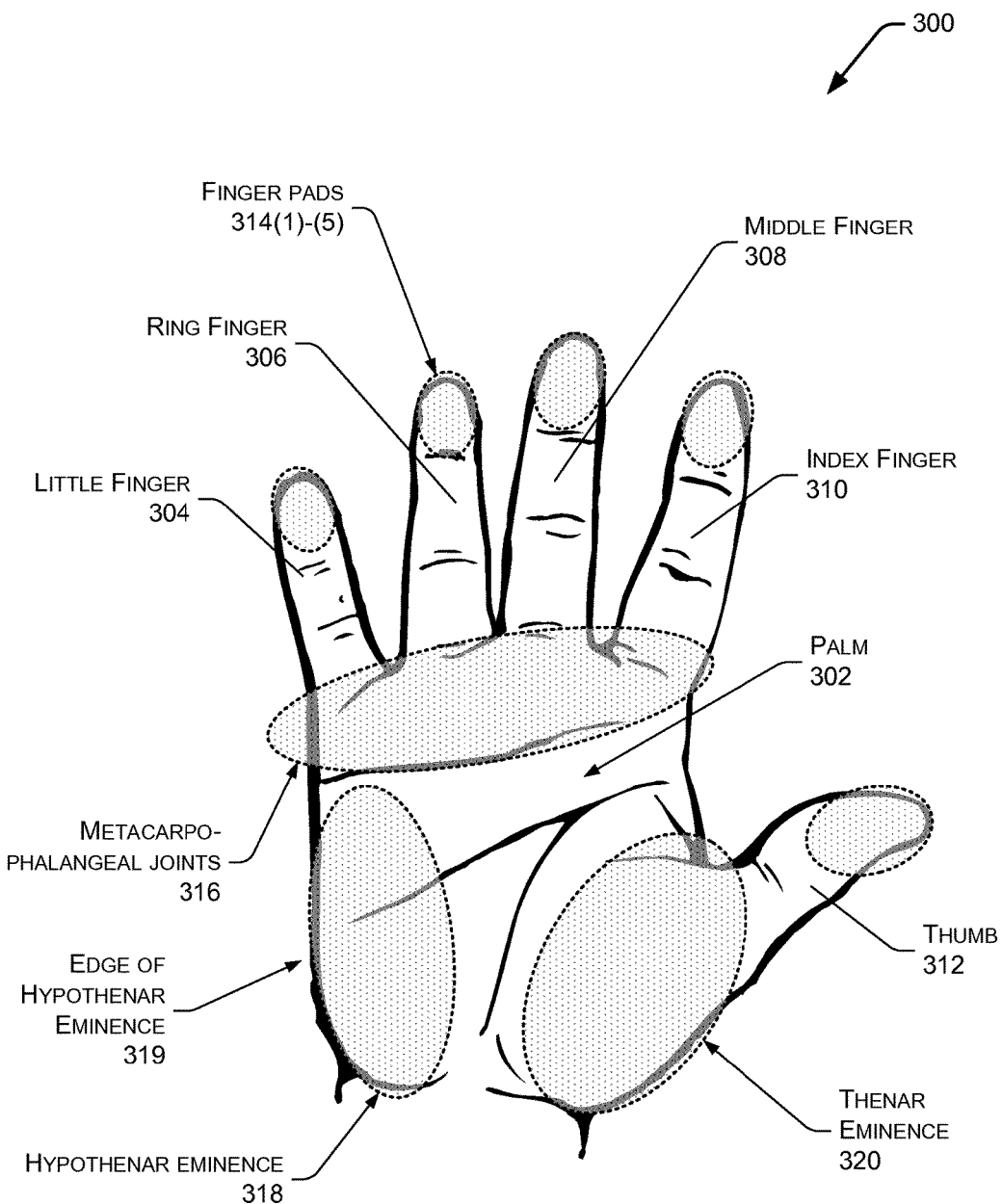
FIG. 3 is an illustration of a human hand and defines some contact areas the hand encounters when in contact with a surface such as the touch sensor.

FIG. 3 is an illustration of a human hand 300. Touches may be imparted on the touch sensor 102 by implements such as styli or directly by the user, such as via all or a portion of the user's hand or hands. Centrally disposed is the palm 302, around which the fingers of the hand, including a little finger 304, ring finger 306, middle finger 308, index finger 310, and thumb 312 are disposed. The user may place finger pads 314 in contact with the touch sensor 102 to generate an input. In some implementations, the user may use other portions of the hand such as knuckles instead of, or in addition to, finger pads 314. The little finger 304, ring finger 306, middle finger 308, and index finger 310 join the palm in a series of metacarpophalangeal joints 316, and form a slight elevation relative to a center of the palm 302. On a side of the palm 302 opposite the thumb 312, a ridge known as the hypothenar eminence 318 is shown. The outer edge of the hand, colloquially known as the "knife edge" of the hand is designated an edge of the hypothenar eminence 319. Adjacent to where the thumb 312 attaches to the palm 302, a prominent feature is a thenar eminence 320.

Touch Profiles

The touch sensor 102 generates output corresponding to one or more touches at points on the touch sensor 102. The output from the touch sensors may be used to generate a touch profile which describes the touch. Touch profiles may comprise several characteristics such as shape of touch, linear force distribution, temporal force distribution, area of the touch, magnitude of applied force, location or distribution of the force, variation over time, duration, and so forth. The characteristics present within touch profiles may vary depending upon the output available from the touch sensor 102. For example, a touch profile generated by a projected capacitance touch sensor may have shape of touch and duration information, while a touch profile generated by an IFSR sensor may additionally supply force distribution information.

Figure 4:
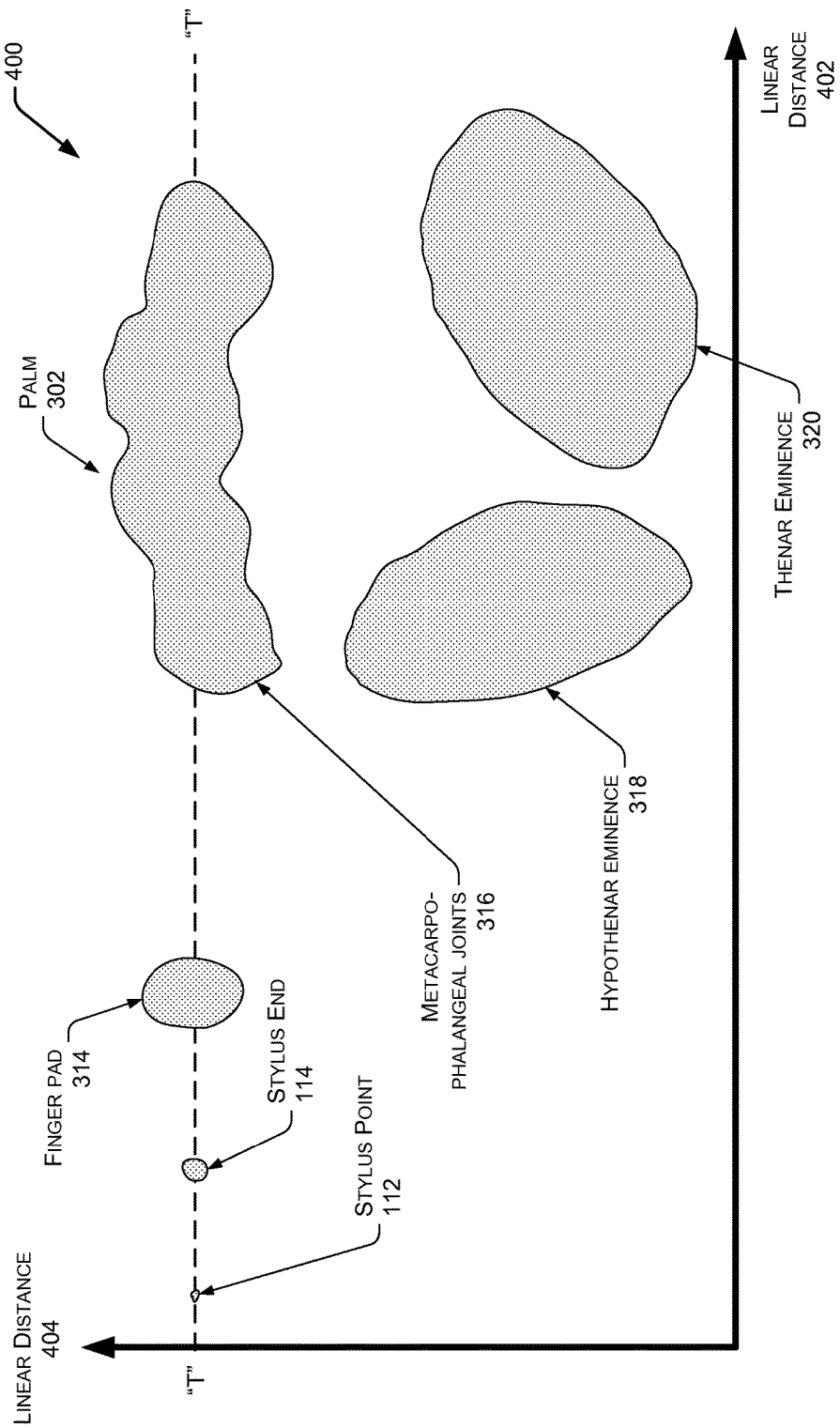
FIG. 4 illustrates contact areas of several objects including a stylus point, a stylus end, a finger, and a human palm with the touch sensor.

FIG. 4 illustrates contact areas 400 resulting from of the contact of several objects with the touch sensor 102. In this illustration, linear distance along an X axis 402 is shown as well as linear distance along a Y axis 404.

The touch profiles may comprise the contact areas 400. As shown here, the stylus point 112 when in contact with the touch sensor 102 generates a very small contact area which is roughly circular, while the stylus end 114 generates a larger roughly circular area. A contact area associated with one of the finger pads 314 is shown which is larger still and generally oblong.

Should the user's palm 302 come in contact with the touch sensor 102, the contact areas of the metacarpophalangeal joints 316, the hypothenar eminence 318, and the thenar eminence 320 may produce contact areas as shown. Other portions of the hand (omitted for clarity, and not by way of limitation) may come in contact with the touch sensor 102 during normal use. For example, when the user manipulates the stylus 110 to write on the touch sensor 102, the user may rest the hand which holds the stylus 110 on the touch sensor, resulting in sensing of the edge of the hypothenar eminence 319.

By monitoring the touches to the touch sensor 102 and building touch profiles, it becomes possible to dynamically adjust a user interface. For example, when the touch profile indicates small fingers such as found in a child, the user interface may automatically adjust to provide a simpler set of commands, reduce force thresholds to activate commands, and so forth.

Figure 5:
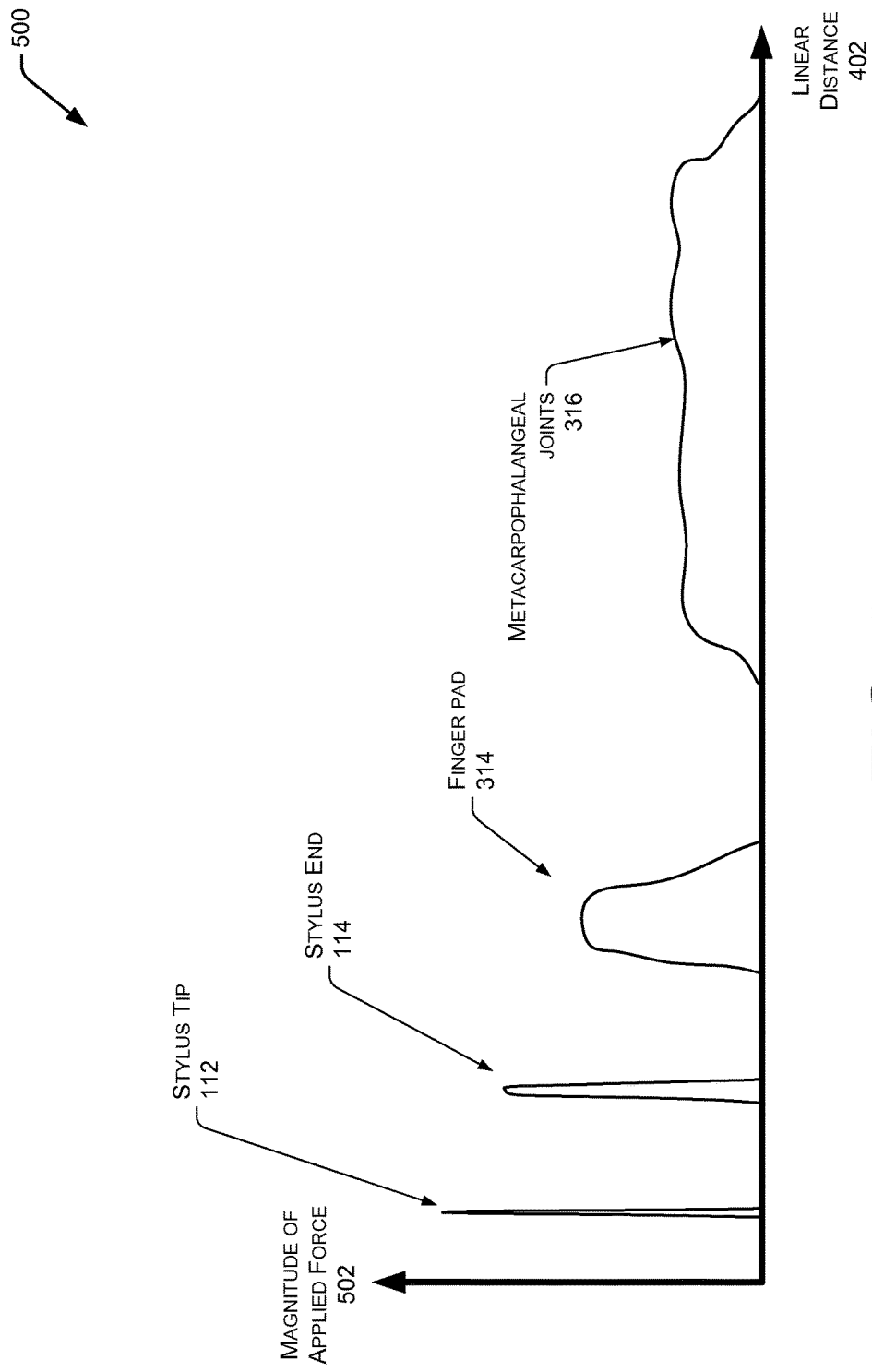
FIG. 5 illustrates a linear force distribution the objects of FIG. 4.

FIG. 5 illustrates a linear force distribution 500 of the touch profiles for the objects of FIG. 4. In this illustration, along the "Y" axis a magnitude of force 502 is shown for each of the objects shown in FIG. 4 along broken line "T" of FIG. 4. As shown, the stylus tip 112 produces a very sharp linear force distribution with steep sides due to its relatively sharp tip. The stylus end 114 is broader and covers a larger area than the stylus tip 112, but also has steep sides. In contrast the finger pad 314 shows more gradual sides and a larger and more rounded distribution due to size and variable compressibility of the human finger. The metacarpophalangeal joints 316 are shown and cover a relatively large linear distance with relatively gradual sides and a much lower magnitude of applied force than that of the stylus tip 112, stylus end 114, and the finger pad 114. Also visible are pressure bumps resulting from the pressure of each of the four metacarpophalangeal joints 316. Thus, as illustrated here, the linear force distributions generated by different objects may be used to distinguish the objects.

Even when objects are distinguished, the objects themselves may produce intentional or unintentional touches. For example, the user may rest a thumb 312 or stylus on the touch sensor 102 without intending to initiate a command or enter data. It is thus worthwhile to distinguish intentional and unintentional touches to prevent erroneous input.

Figure 6:
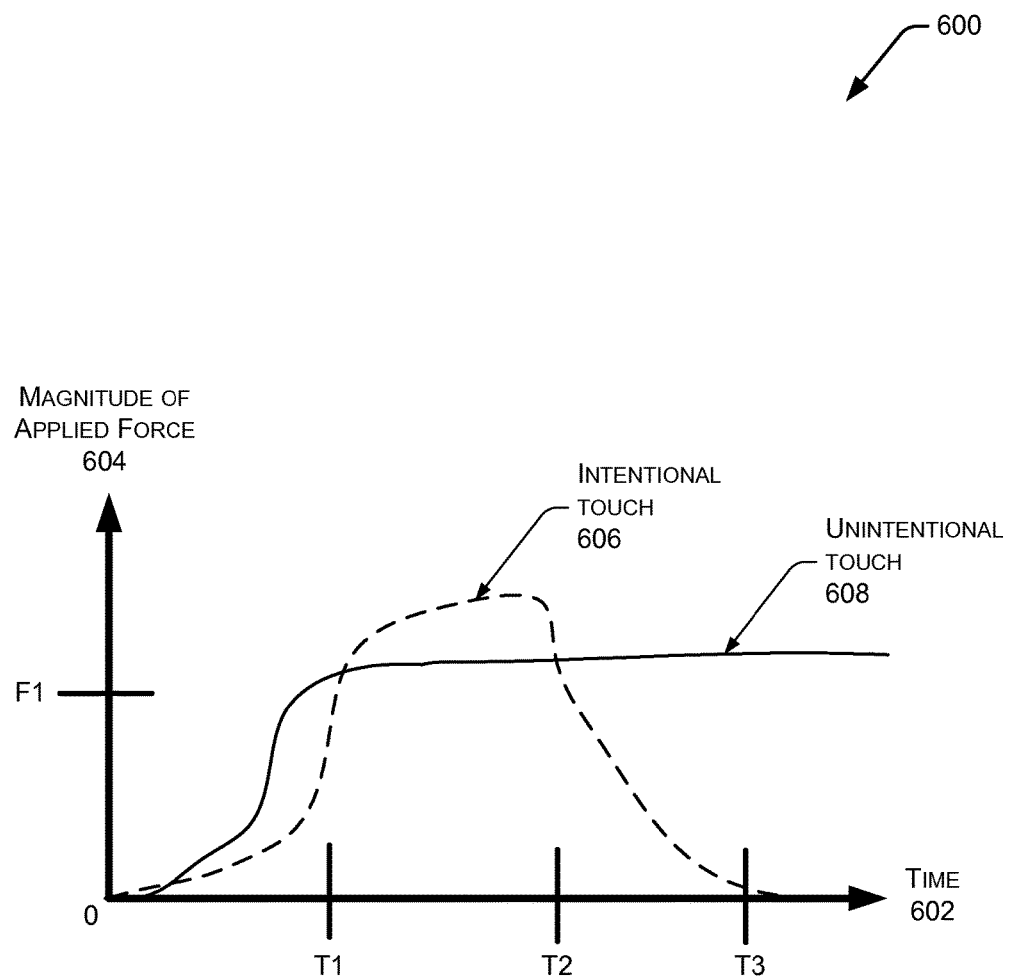
FIG. 6 illustrates a temporal force distribution which may be used to distinguish between intentional and unintentional touches.

FIG. 6 illustrates a temporal force distribution 600. The temporal force distribution 600 may be used to distinguish between intentional and unintentional touches. By analyzing a change over time, it is possible to determine when a touch is intentional or unintentional. These changes may be to force, area, and so forth. For example, in some implementations where force data is not available such as with a projected capacitance touch sensor, changes such as variation in touch area may be used. Where the touch sensor 102 is force sensitive, changes in force over time may be used. The following examples are made with respect to force sensitive touch sensors by way of illustration and not as a limitation.

In this figure, time 602 is shown along an X axis while the magnitude of applied force 604 is shown along a Y axis. A pre-determined threshold of force F1 may be set such that when a touch exceeds the pre-determined threshold of force, an action is initiated. For example, the action may comprise changing an eBook page on the display 104.

While the pre-determined threshold of force allows for some distinction between intentional and unintentional touches, unintentional activation by exceeding the threshold may still occur. This figure depicts the temporal force distributions of an intentional touch 606 and an unintentional touch 608. Both of these touches may have applied forces which exceed threshold F1 and thus could result in initiation of an action. However, activation from the unintentional touch 608, such as from a user grasping the touch sensor 102, is undesirable.

By analyzing the temporal force distributions 606 and 608, it is possible to determine when a touch is intentional or unintentional. For example, as illustrated here, the intentional hold 606 exhibits a sharp increase in force at about time T1, lasting until about time T2, and then experiences a decline over time. In contrast, the unintentional hold 608 ramps up at T1, then remains at about the same magnitude past time T3. Thus, the intentional hold is clearly distinguished by its distinctive temporal force distribution.

Figure 7:
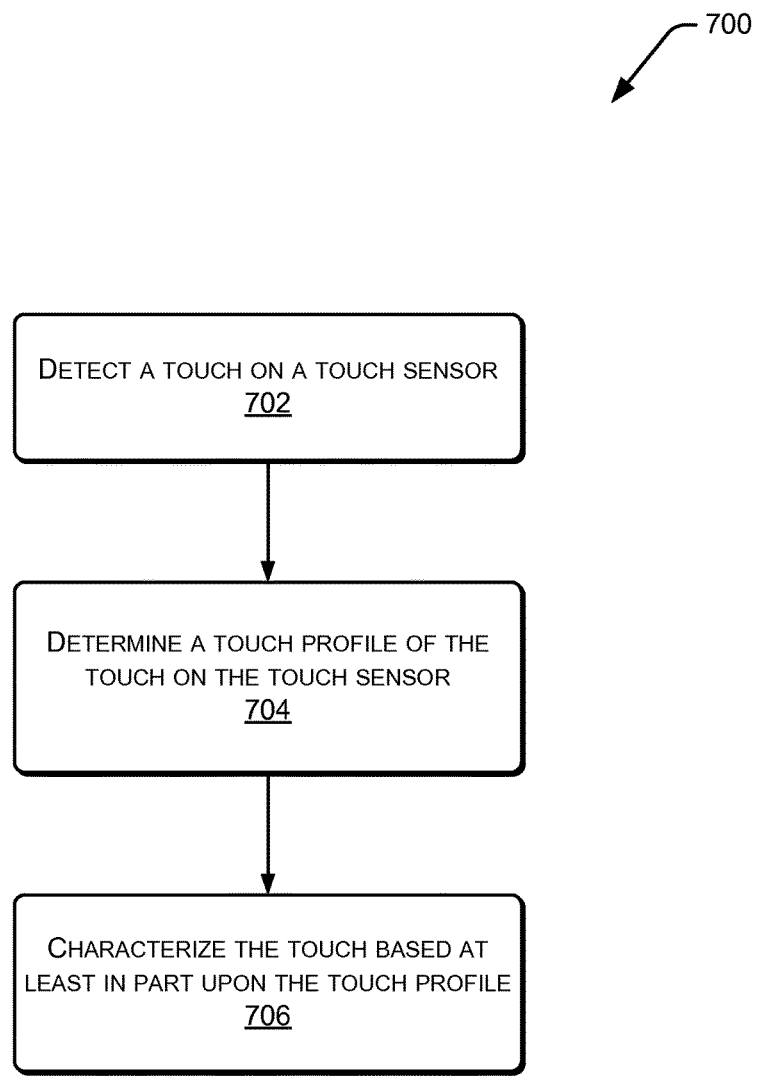
FIG. 7 is an illustrative process of characterizing a touch based on a touch profile.

FIG. 7 is an illustrative process 700 of characterizing a touch based on the touch profile of the touch. This process, and others described in this disclosure may, be implemented by the architectures described in this disclosure, or by other architectures. These processes described in this disclosure are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

At 702, the input module 106 detects a touch 108 on the touch sensor 102. At 704, the input module 106 determines a touch profile of the touch on the touch sensor. As described above this touch profile may include a linear force distribution, a temporal force distribution, an area, duration, or other characteristics. At 706, the input module 106 characterizes the touch based at least in part upon the touch profile. For example, a linear force distribution of the touch with a contact area below a pre-determined threshold and steep sides may be characterized as the stylus tip 112.

Figure 8:
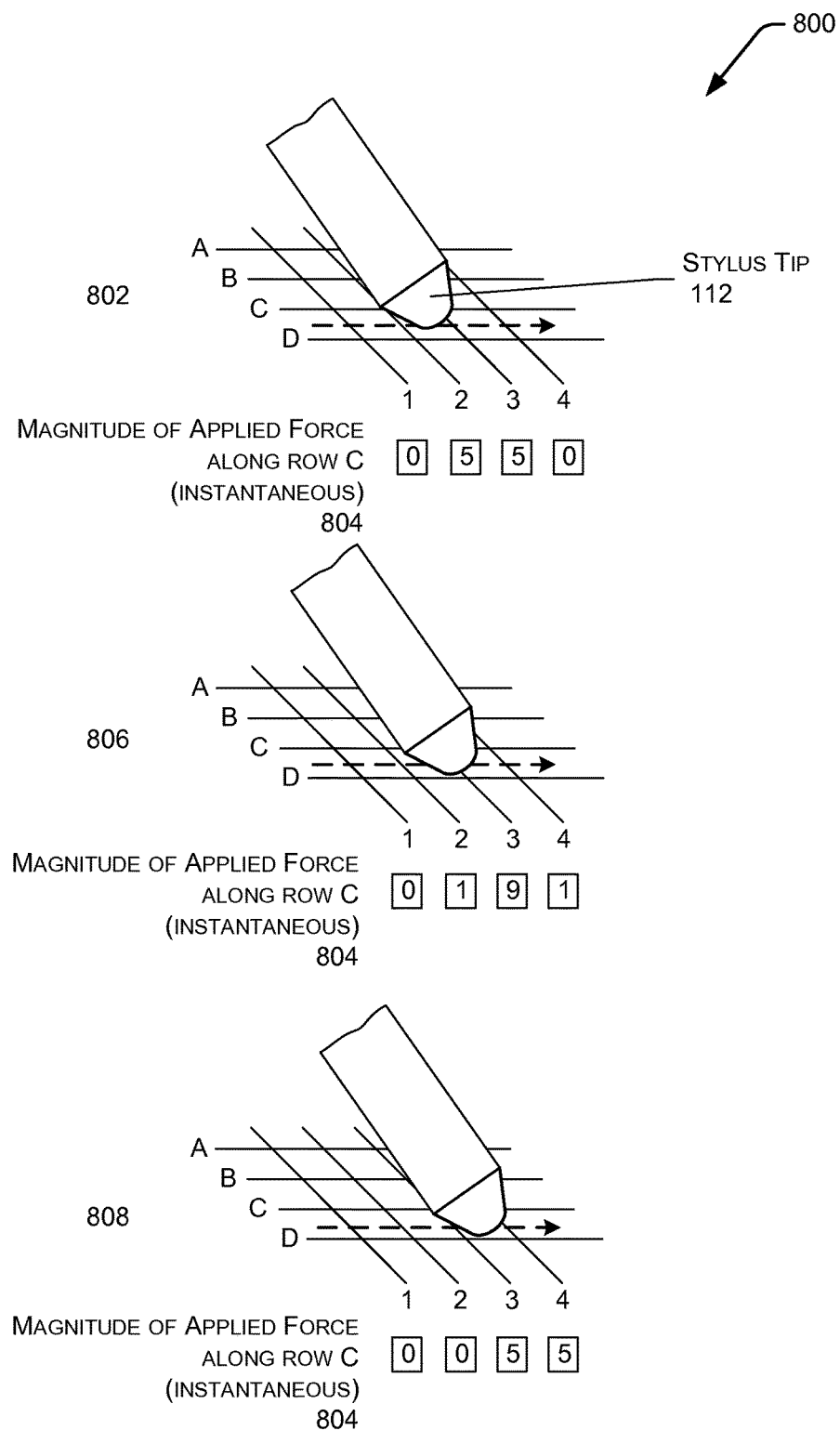
FIGS. 8 and 9 illustrate scenarios of a stylus and a finger moving across a force sensitive touch sensor, and a sequence of force measurements at specified sensing elements (or "sensels") during successive time intervals.

Interaction with the touch sensor 102 provides additional details in the touch profile which are suitable for distinguishing touches. FIG. 8 illustrates a scenario 800 of a stylus moving across a force sensitive touch sensor 102. At 802, the stylus 110 is moving along the surface of the touch sensor 102 in a horizontal path illustrated by a broken line between rows C and D. The stylus tip 112 is between the sensels resulting from the intersections of rows C and D and columns 2 and 3, respectively. Shown is the magnitude of applied force 804 as measured at sensels along row C on a scale ranging from 0 (no touch) to 9 (hard touch). At the moment of time presented here, the force measured at sensels C1 and C4 are zero, due to the small contact area of the stylus tip 112. Likewise, the force at measured at sensels C2 and C5 is shown as 5, while the stylus tip 112 is midway between the sensels at C2 and C3.

At 806, the stylus tip 112 is closest to the sensel C3. As a result, a corresponding peak in the applied force at C3 with a measured force of 9 is shown flanked by forces of 1 at sensels C2 and C4. Because of the small contact area and concentrated force at the presence at a column, the force is detectable at three of the sensels shown and reflects a well defined peak of force across those sensels. As the stylus tip 112 moves along, similar to above with regards to 802, the sensels at C3 and C4 measures a force of 5, while C2 and C5 (not shown) are zero. This distribution of forces may be contrasted with the scenario in the next figure involving the blunter finger of the user.

Figure 9:
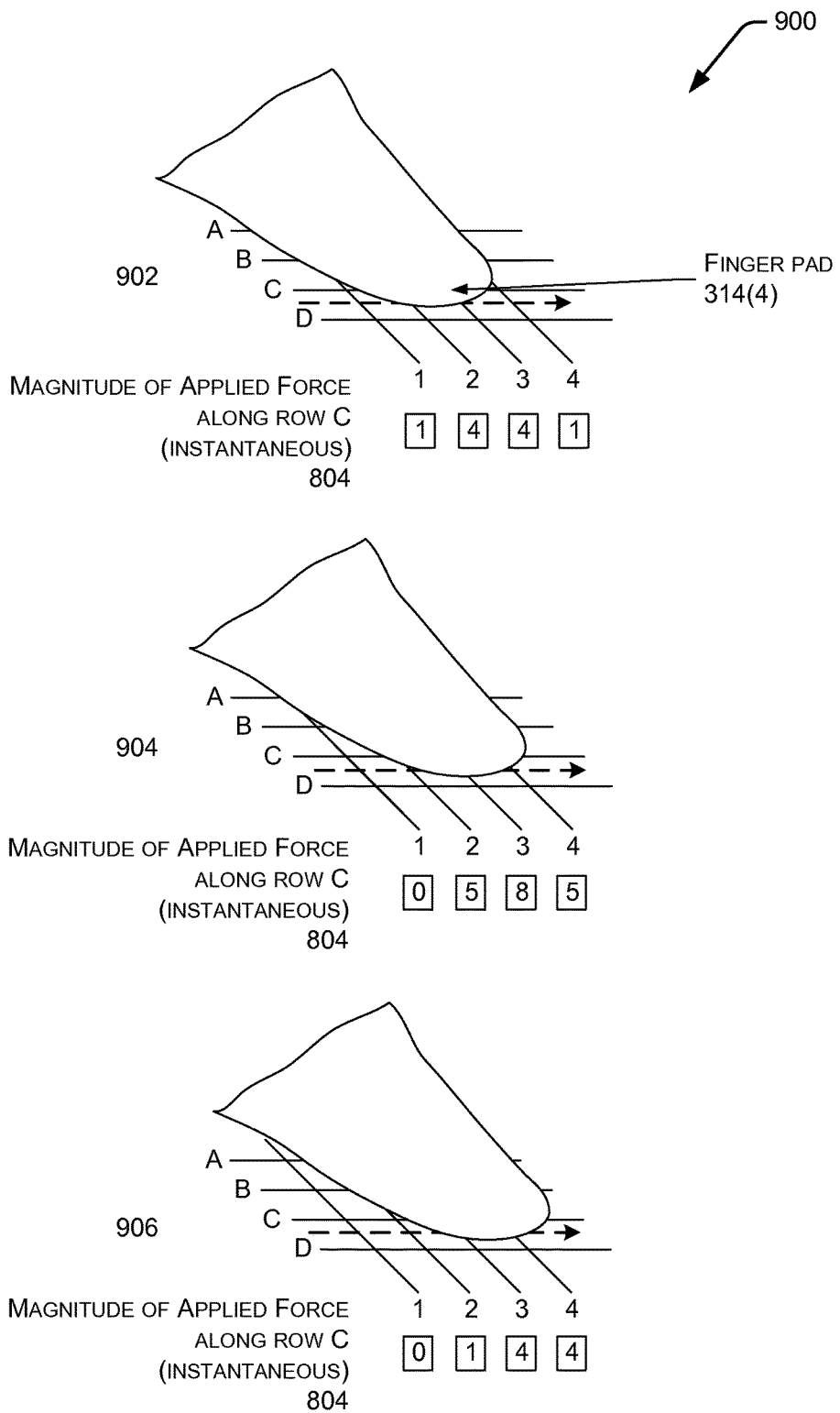

FIG. 9 illustrates a scenario 900 of a finger moving across the force sensitive touch sensor 102. At 902 the finger is moving along the surface of the touch sensor 102, similar to the path above with respect to FIG. 8. The finger 110 is in between the sensels at C2 and C3. As above, shown is the magnitude of applied force 804 along sensels in row C. Because the finger pad 314 is a blunter implement, the applied force is spread out over a greater area, and hence is detected by more sensels. As shown here, the magnitude of the applied forces 804 along sensels C1, C2, C3, and C4 are 1, 4, 4, and 1 respectively.

At 904, the finger is closest to the sensel C3 and a corresponding peak in the applied force measurements along the sensels is apparent. The magnitude of the applied force 804 peaks at C3 with a force of 8, while the adjacent sensels C2 and C4 report a force of 5. The more distant sensels C1 and C5 (not shown) report no force. This distribution in force generated by the finger is thus readily distinguishable from the peak generated by the stylus 112. At least a portion of this distinction arises from a comparison of a ratio of force applied and distance between sensels. As a result, it is possible to distinguish between the object based at least in part upon the interaction with the sensels. At 906, as the finger moves away from sensel closest to C3 and at the midpoint between C3 and C4 demonstrates a similar force profile as discussed above at 902.

The above scenario of FIGS. 8-9 involves a moving stylus and finger. However, the same determination may be made when the object does not move. When a touch takes place on a sensel, the object may be distinguished by observing a similar peak. For example, the touch profiles when the stylus tip 112 or the finger is pressed directly onto a sensel will exhibit a similar difference between linear force distributions.

Figure 10:
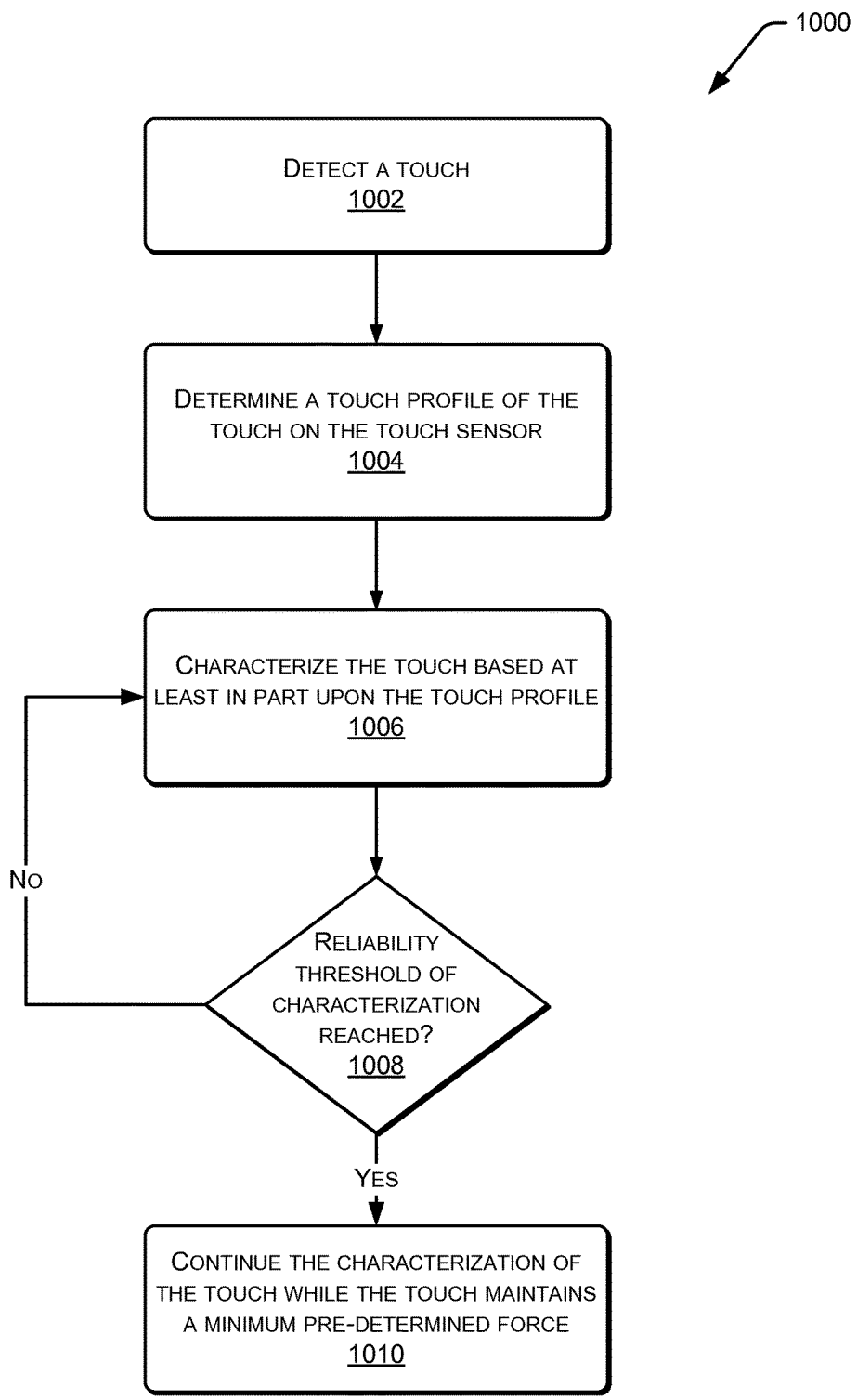
FIG. 10 is an illustrative process of characterizing a touch based on the touch profile of the touch and maintaining the characterization of the touch during subsequent movements.

FIG. 10 is an illustrative process 1000 of characterizing a touch based on the touch profile and maintaining the characterization of the touch during subsequent movements. At 1002, the input module 106 detects a touch 108 on the touch sensor 102. At 1004, the input module 106 determines a touch profile of the touch on the touch sensor 102. As described above, this touch profile may include a linear force distribution, a temporal force distribution, an area, duration, or other characteristics. At 1006, the input module characterizes the touch based at least in part upon the touch profile. This characterization of the touch may be assigned a metric indicating reliability which is used to determine when a reliability threshold of characterization has been achieved. For example, where the touch profile provides a highly defined indication that the touch is of a stylus, the reliability metric may be high for that particular characterization.

Similarly, where the touch profile provides a less definitive indication, a lower reliability metric may be assigned to the characterization of the touch.

At 1008, the input module 106 assesses the reliability metric for the characterization. When a reliability threshold of characterization has been reached, the process proceeds to 1010. At 1010, the input module 106 continues the characterization so long as the touch maintains a minimum predetermined force. When the reliability threshold of characterization has not been reached, at 1008 the process returns to 1006 and continues to characterize and re-characterize the touch.

For example, where the touch profile indicates a force spike consistent with the stylus 112, the input module 106 maintains the designation of the touch as being a stylus input while the touch moves around on the touch sensor. In some implementations, this may allow the input controller 106 to cease the process of characterizing the ongoing touches, resulting in reduced computational overhead, reduced power consumption, and so forth.

Managing Touches

The input module 106 may characterize touches in order to more readily determine what input is intended by the user. Touches may be characterized as finger touches, stylus tip touches, stylus end touches, intentional touches, unintentional touches, holding touches, and so forth. Where the touch, or a series of touches, are ongoing, such as during entry of handwriting, it is advantageous to maintain some persistence as to the characterization between touches which are adjacent in space, time, or both. Advantages include minimizing the need to computationally re-characterize a touch, ability to avoid calculation of contact area centroids, and so forth.

Furthermore, persistence of the characterization improves responsiveness and ease of use for the user. In the following examples, assume the user is entering text with the stylus 110 on the touch sensor 102. This text contains various letters, as well as several diacritical marks such as the dots atop several lowercase "i" characters and horizontal bars through lowercase "t" characters.

Figure 11:
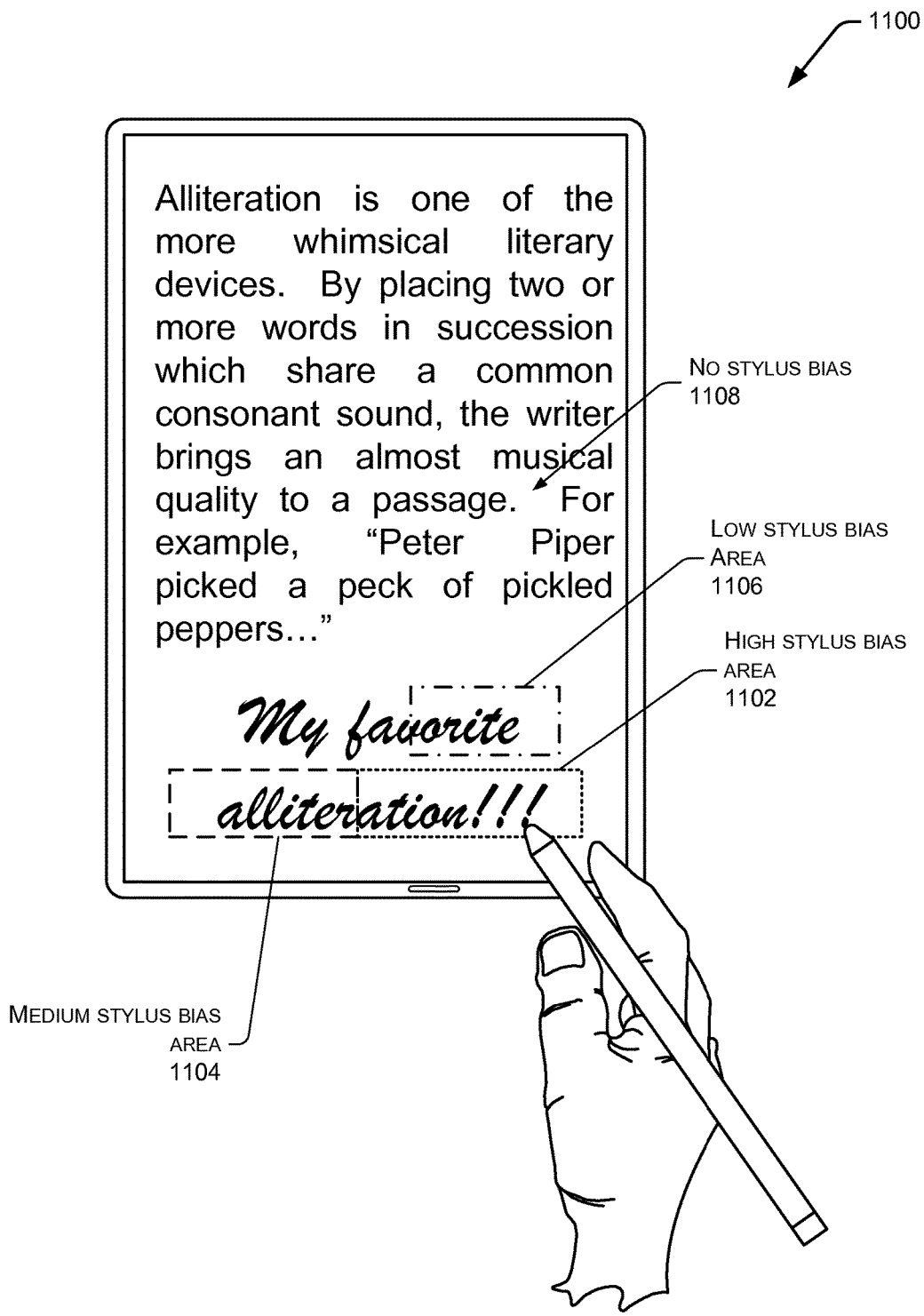
FIG. 11 illustrates the electronic device having multiple areas associated with prior touches and different biasing for characterization of touches within those areas.

FIG. 11 illustrates the electronic device 100 having multiple areas 1100 associated with prior touches and applying different biases for characterization of touches within those areas. In this illustration, the areas are shown with broken lines of various types on the device 100. However, it is understood that during actual operation the user need not be presented with such visual indicia.

Proximate to the stylus tip 112 is a high stylus bias area 1102. Touches within this area are assigned a high bias as being deemed touches by the stylus tip 112. Within this area, touches may not be continuously re-characterized. This minimizes the processing requirements for characterization, while also improving the user interface experience by providing persistence for the entry of additional characters, diacritical marks, and so forth. For example, as shown here, the user may draw the vertical bodies of three exclamation points and follow up with placing the corresponding dots below the body of each exclamation point without manually actuating any further command.

The area of persistence may be envisioned in some implementations as a trailing area which fades over time. As shown here, a medium stylus bias area 1104 covers a first portion of the word "alliteration." Within this area 1104, touches may be assigned a medium bias, indicating that they are likely to be stylus touches. Similarly, in an older portion of entered text, a low stylus bias area 1106 is present. Touches within this area are given a lesser bias. As time continues, the persistence continues to fade and the remaining areas are assigned no stylus bias 1108. Within these areas, the input module 106 again characterizes the touches without regard to prior activity. In some implementations, the biasing may fade based on distance from a pre-determined point, rather than time.

Figure 12:
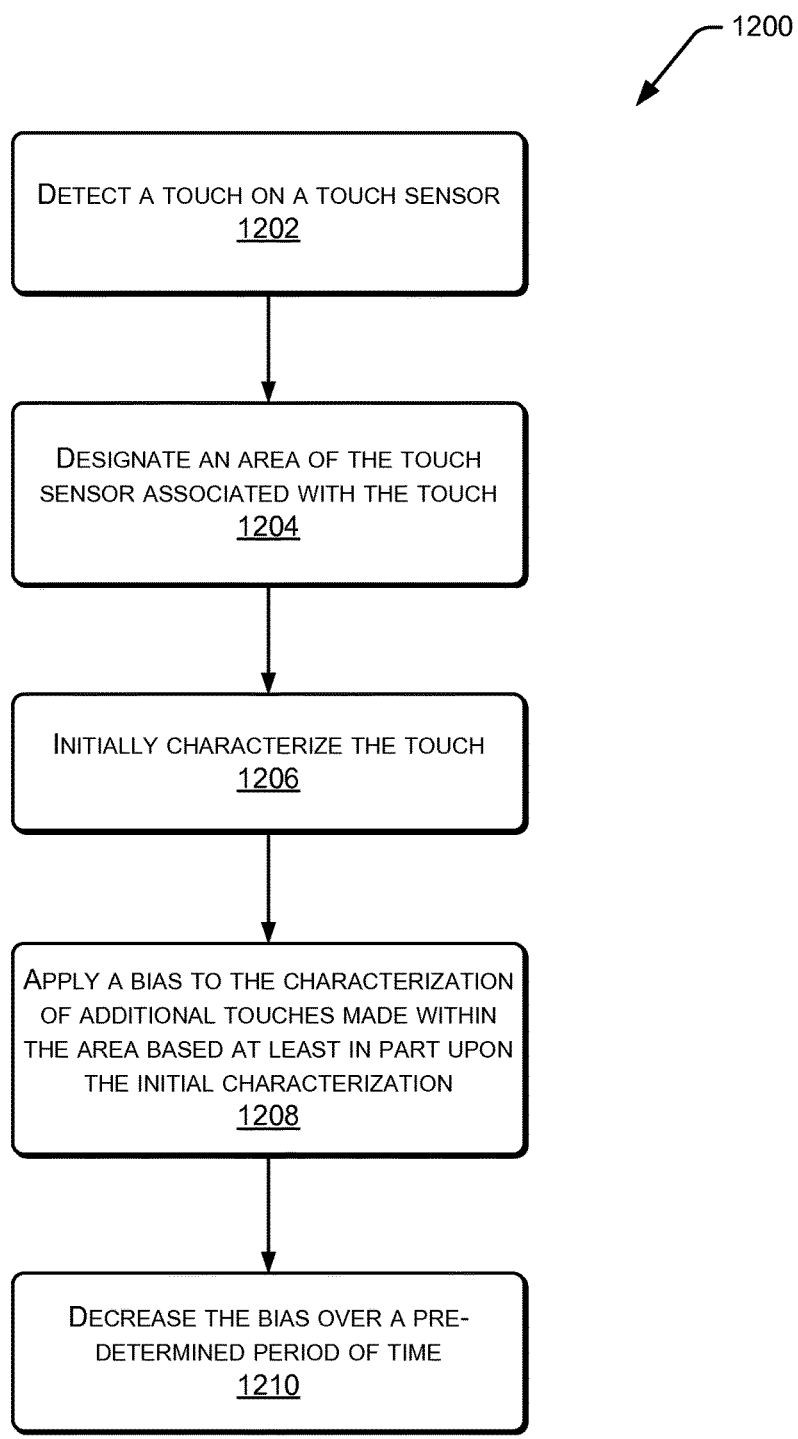
FIG. 12 is an illustrative process of characterizing areas associated with prior touches and having the characterization fade over a pre-determined period of time.

FIG. 12 is an illustrative process 1200 of characterizing areas associated with prior touches and having the characterization fade over a pre-determined period of time. At 1202, the input module 106 detects a touch on the touch sensor 102. At 1204, the input module 106 designates an area of the touch sensor associated with the touch. At 1206, the input module 106 generates an initial characterization of the touch. For example, the input module 106 may characterize the touch as that of a stylus tip based on the touch profile.

At 1208, the input module characterizes additional touches made within the area based at least in part upon the initial characterization. In some implementations, this characterization may comprise applying a biasing factor to the additional touches. For example, the touches made to place the dots under the exclamation point bodies within the high stylus bias area 1102 are characterized as stylus touches.

At 1210, the input module 106 decreases the bias over a pre-determined period of time given to touches within the area. For example, if the user of FIG. 11 were to set down the stylus and return after the pre-determined period of time has expired to enter the exclamation point dots, the touches associated therewith would be re-categorized as stylus touches.

Figure 13:
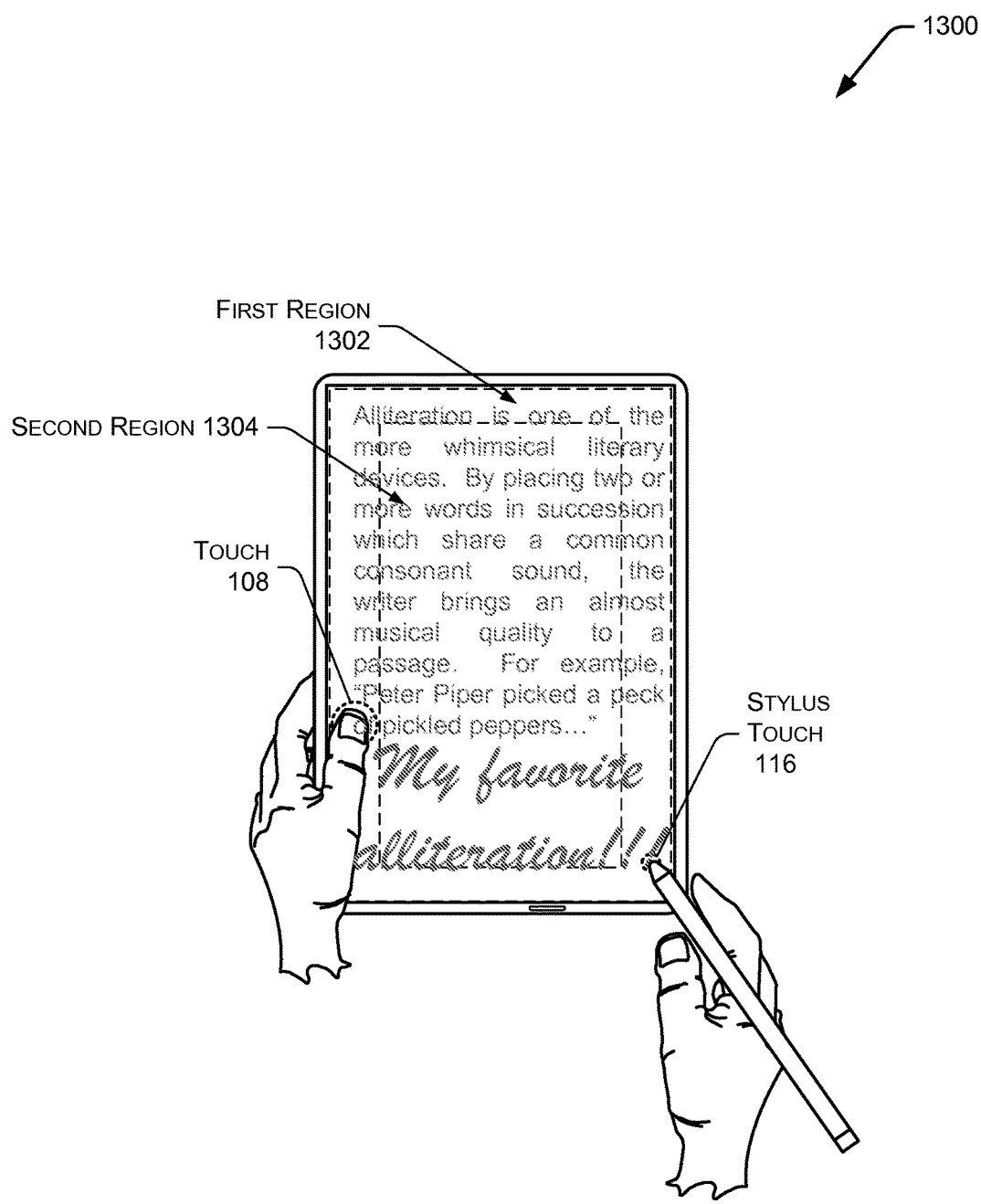
FIG. 13 illustrates the electronic device having multiple regions and different biasing for characterization of input within those areas.

To further facilitate characterization of touches, larger portions or regions of the touch sensor may be designated. FIG. 13 illustrates the electronic device 100 having multiple regions 1300 and different biasing for characterization of input within those areas. In this illustration a first region 1302 extends around a perimeter or border of the touch sensor 102. Within this first region, touches are most likely finger touches and may be biased accordingly. For example, the input module 106 may consider touches within this area more likely to be holding touches, or associated with a particular subset of gestures, such as page turn commands for an eBook.

A second region 1304 is depicted in this illustration within the first region, shown here as a central area of the touch sensor 102. Similar to the areas above with respect to FIG. 11, touches within the regions are biased towards a particular touch characterization. The number, size, and geometry of the regions may vary. In some implementations the regions may correspond to user input areas on a form. For example, a box for a user to write in a name on a form presented on the display may be designated a region in which touches are biased in favor of being a stylus.

Regions may be set based upon a variety of user and environmental factors. In one implementation, the input module 106 may adapt to usage patterns. For example, the input module 106 may learn that the user is likely to hold the device on the left side, and designate a corresponding region to bias touches within that region as unintentional touches. In another implementation, the regions may be designated based upon the orientation or nature of content presented by the device 100. For example, where an eBook is presented in landscape mode on the display 104, regions on the top and bottom of the touch sensor 102 where a user holding the device 100 when in landscape mode may be designated as likely holding touch regions. Data from other sensors such as orientation sensors 120 may also be used to determine the placement, size, shape, and so forth of the regions.

Figure 14:
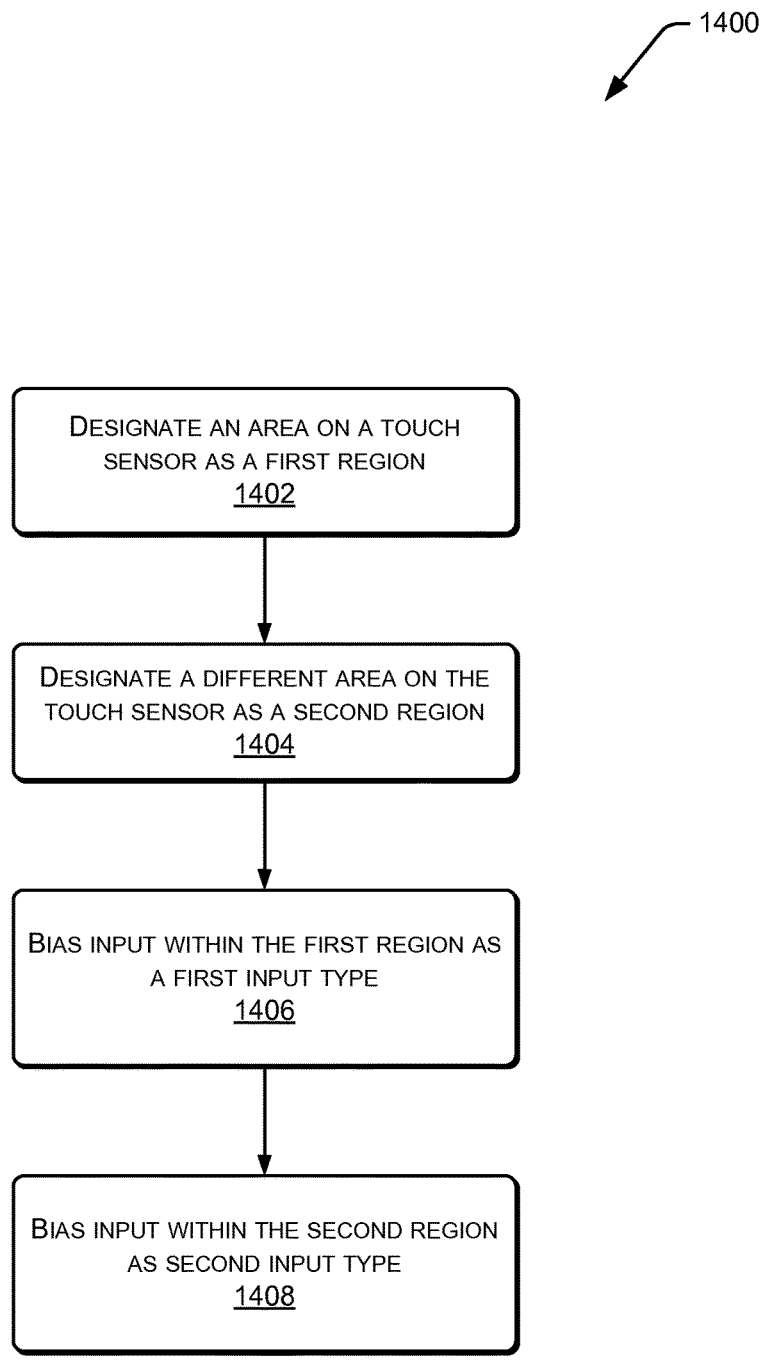
FIG. 14 is an illustrative process of designating two or more regions to characterize touches.

FIG. 14 is an illustrative process 1400 of designating two or more regions to characterize touches. At 1402, the input module 106 designates an area on the touch sensor 102 as a first region. At 1404, the input module 106 designates a different area on the touch sensor as a second region. At 1406, the input module 106 biases input from within the first region as a first input type. For example, touches within the first region may be biased to be considered holding touches. At 1408, the input module 106 biases input from within the second region as a second input type. For example, the touches within the second region may be biased to be considered stylus touches.

Biasing may vary from region to region. For example, touches within the first region may be biased heavily as being holding touches, while touches within the second region may be lightly biased as being stylus touches. Some regions may be configured with zero biasing, indicating each touch is to be characterized. The regions may manifest as other shapes. For example, regions may be circular, elliptical, rectangular (as shown), or may be defined by an irregular or non-geometric boundary. For example, a two-dimensional array of numbers describing the strength of the bias across the surface of the touch sensor 102 may be used. In some implementations, bias values for positions between locations of the array may also be interpolated.

Figure 15:
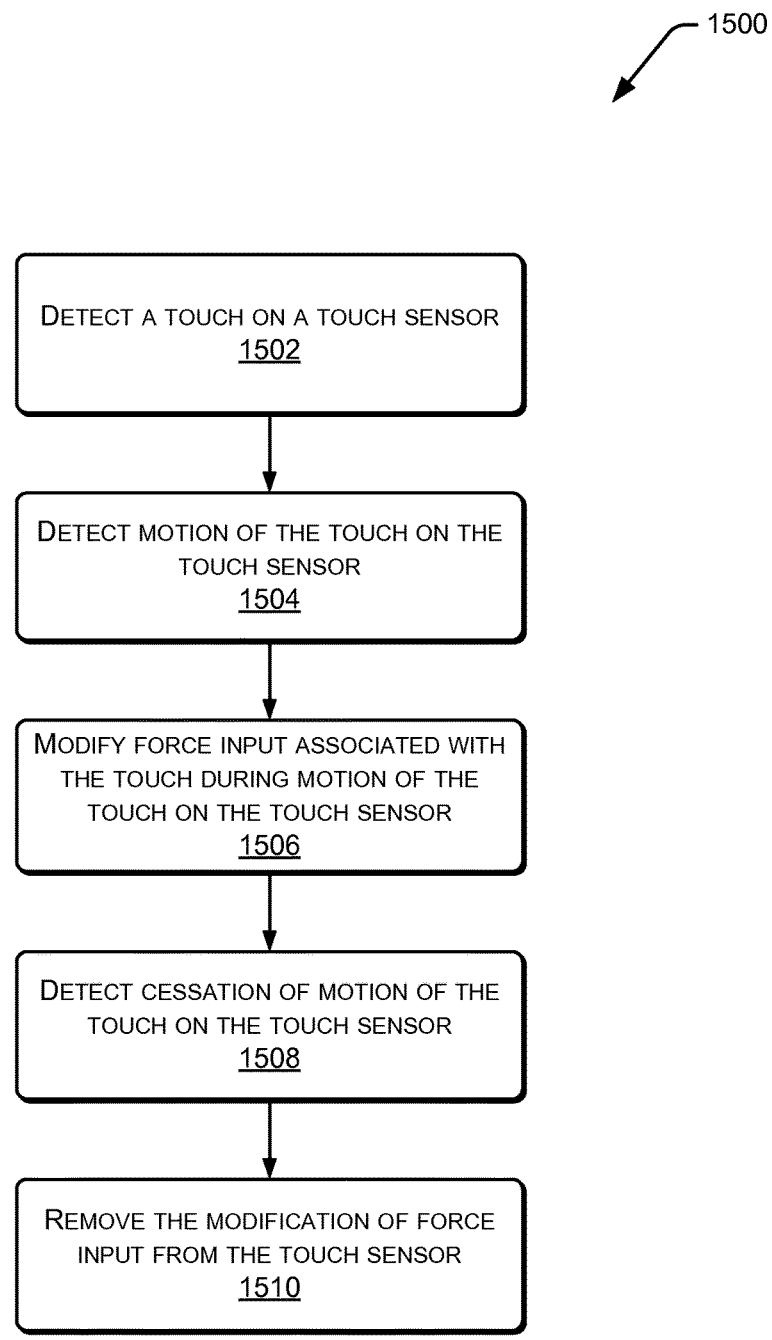
FIG. 15 is an illustrative process of modifying force input associated with a moving touch.

FIG. 15 is an illustrative process 1500 of modifying force input associated with a moving touch. While using a force sensitive touch sensor 102, the magnitude of the force may be a factor for generating output. For example, a harder touch may result in a change to the output. However, maintaining a constant force while the touch moves is difficult for some users due to varying geometries, biomechanical factors, and so forth. As a result, to avoid erroneous inputs during motion of a touch on the force sensitive touch sensor, the output may be modified.

At 1502, the input module 106 detects a touch on the touch sensor 102. At 1504, the input module 106 detects a motion of the touch on the touch sensor 102.

At 1506, the input module 106 modifies force input from the user which is associated with the touch while the touch is in motion. This modification may include de-rating or de-emphasizing the force input. Thus, a pre-determined command activation threshold force necessary to initiate a command may be increased during movement such that the user is required to push harder to activate the command. Likewise, when the touch is stationary the pre-determined command activation threshold force may be decreased, allowing for a lesser push to activate the command. In some instances force input may be disregarded altogether. This modification thus reduces the likelihood of erroneous input due to variations in the applied force during a moving touch.

In some implementations, during movement, an overall touch detection threshold may be decreased during movement, allowing the lighter or varying pressure touch to be continuously tracked while in motion. For example, the overall touch detection threshold may require a touch to apply a pressure of 20 grams or more to be considered a touch. Once the touch is recognized and the touch begins to move, the overall touch detection threshold may be reduced during movement, such as to 10 grams in this example. This temporary reduction improves tracking of a moving touch where applied force may vary due to changes in orientation, biomechanics, and so forth. Once motion stops, the overall touch detection threshold may resume the previous value, in this example 20 grams.

At 1508, the input module 106 detects cessation of motion of the touch on the touch sensor 102. At 1510, the input module 106 removes the modification of the touch input from the touch sensor. With the motion complete, force input again becomes fully available to receive user inputs.

Figure 16:
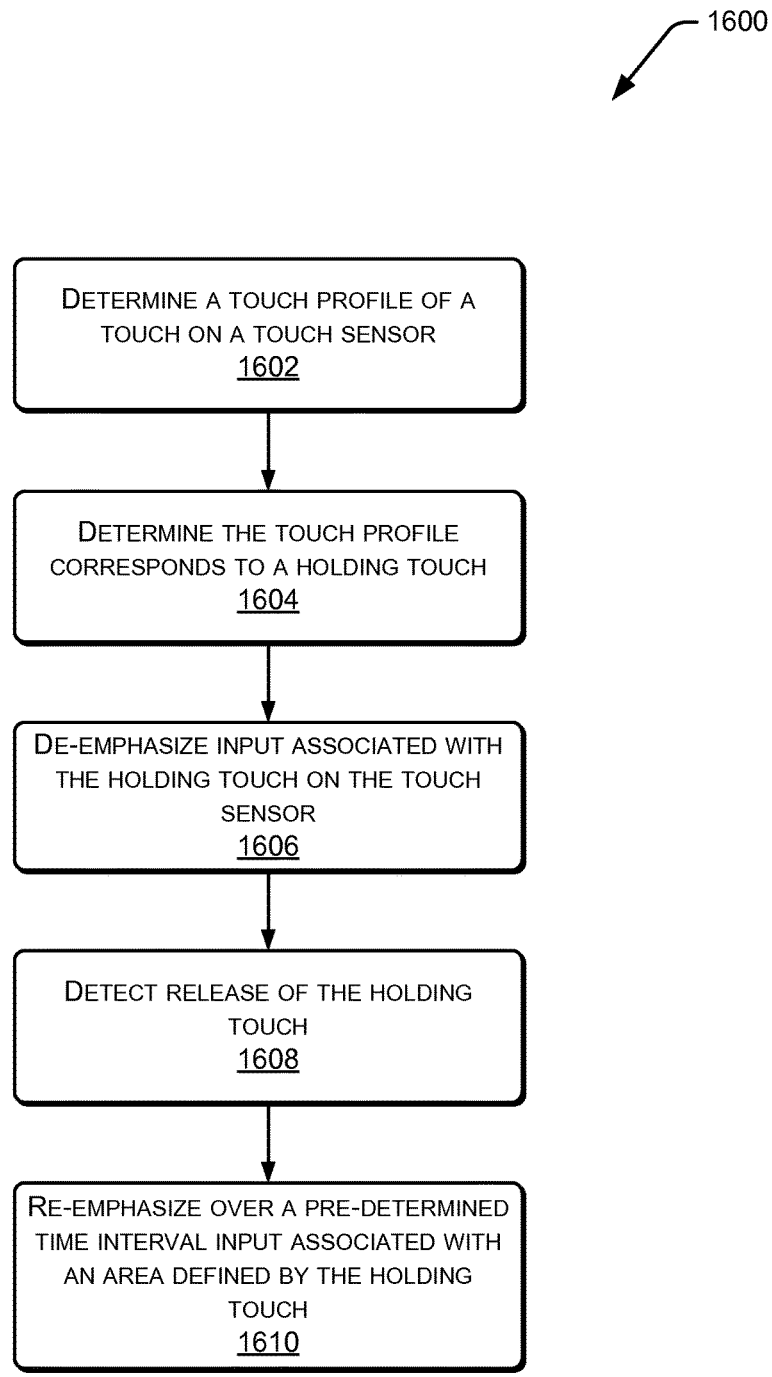
FIG. 16 is an illustrative process of modifying input associated with a holding touch.

FIG. 16 is an illustrative process 1600 of modifying input associated with a holding touch. A holding touch occurs when the user does not intend the touch as an input, but the touch is rather a consequence of holding the touch sensor 102 or the electronic device 100. By determining that a touch is a holding touch the input module 106 may reduce or eliminate erroneous input, minimize or eliminate actions such as calculating a centroid of the holding touch, and so forth.

At 1602, the input module 106 determines a touch profile of a touch on the touch sensor 102. At 1604 the input module 106 determines the touch profile corresponds to a holding touch. In one implementation, this determination may comprise assessing whether the touch exceeds a pre-determined time interval and that the temporal force distribution is relatively stable. A holding touch may be characterized by the touch profile indicating the application of force to an area on the touch sensor remains within a pre-determined force boundary for a pre-determined time. For example, a touch of more than 10 seconds which maintains a force between 2 newton and 3 newtons is considered stable. In other implementations, the pre-determined force boundary may comprise a percentage of variation over time. For example, the touch may be considered stable when the applied force is maintained within 5% of a moving average of the applied force.

At 1606, the input module 106 de-emphasizes input associated with the holding touch on the touch sensor. For example, touches within an area associated with the holding touch are disregarded.

At 1608, the input module 106 detects release of the holding touch. For example, the user may set down and release a grasp on the device. At 1610, the input module 106 re-emphasizes over a pre-determined time interval input associated with the area defined by the holding touch. This re-emphasis over the pre-determined time interval prevents erroneous input in situations such as where the user is holding the device, and momentarily releases and re-grasps the device.

Figure 17:
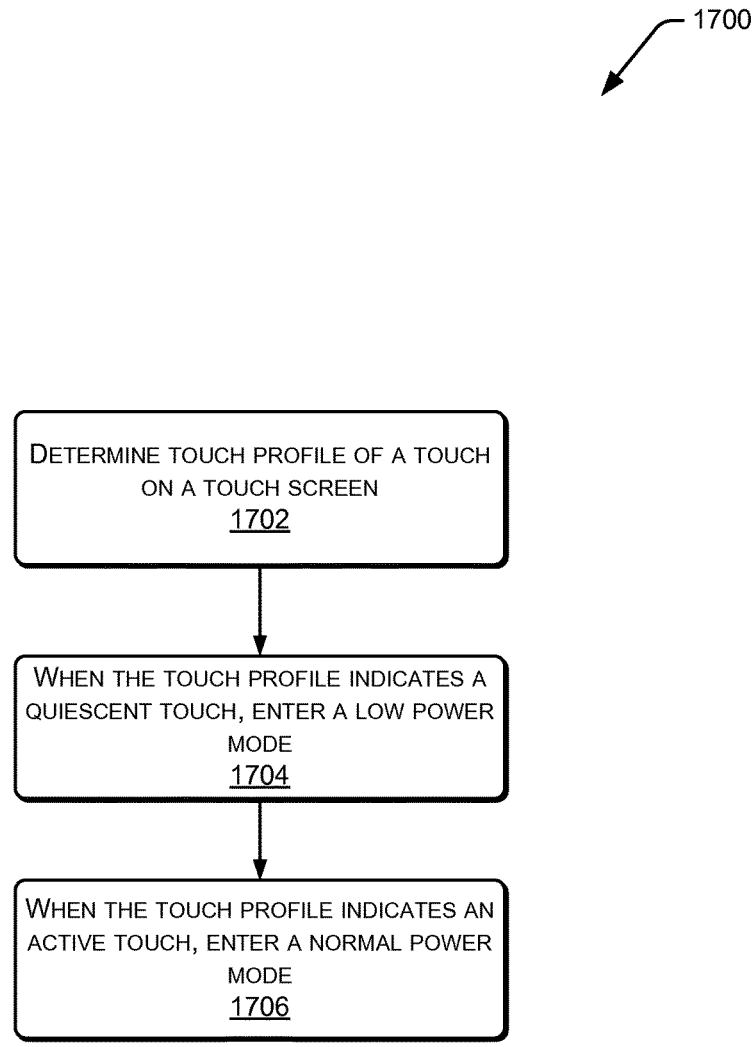
FIG. 17 is an illustrative process of entering a low power mode when a touch profile indicates a quiescent touch.

FIG. 17 is an illustrative process 1700 of placing the touch sensor and/or associated controllers into a low power mode. As described above, reducing power consumption in electronic devices 100 offers several benefits such as extending battery life in portable devices, thermal management, and so forth. Because users seldom constantly input data and seldom use all available areas on the touch sensor 102 simultaneously, it becomes reasonable to place the touch sensor 102 and/or associated components such as the touch sensor controller 214 and so forth into lower power modes.

At 1702, the input module 106 determines a touch profile of a touch on the touch sensor 102. For example, the input module 106 may determine that a touch is a holding touch. Holding touches, unintentional touches, and so forth may be considered quiescent touches. In contrast, active touches include a moving stylus, active control inputs, and so forth.

At 1704, when the touch profile indicates a quiescent touch, or when no touches are present, the touch sensor 102 and/or associated components may be placed into a low power mode. For example low power mode may comprise a decrease in the scan rate of the sensor, changing which parts of the sensor are being scanned, altering scan resolution, and so forth.

At 1706, when the touch profile indicates an active touch, enter a normal power mode. For example, when the user starts to move a touch on the screen, such as to handwrite a comment or select a command, the touch sensor 102 awakens and resumes a more wakeful mode, such as normal power mode.

Furthermore, there may be different operational modes depending upon the characterization of the touch or pre-determined settings. For example, where the touches comprise handwriting input via the stylus, the touch sensor may be configured to operate in the highest scan rate with best resolution to capture the detailed input from the user. Where the input is less precise, such as selection of user controls or finger based input, the scan rate and resolution may be set to an intermediate value configured to provide adequate input.

Magnetic Implements and Operation

In addition to fingers, users may wish to use implements such as styli, pucks, tokens, and so forth in conjunction with touch and near-touch sensors. These implements may incorporate magnets suitable to work in conjunction with the magnetic field sensors. For ease of description, these implements are referred to as "magnetic implements." However, it is understood that the implement incorporates at least one magnet, but need not be entirely magnetic. These implements thus incorporate a magnet which, when used in conjunction with magnetic field sensors coupled to the device, provides for additional functionality and features.

Figure 18:
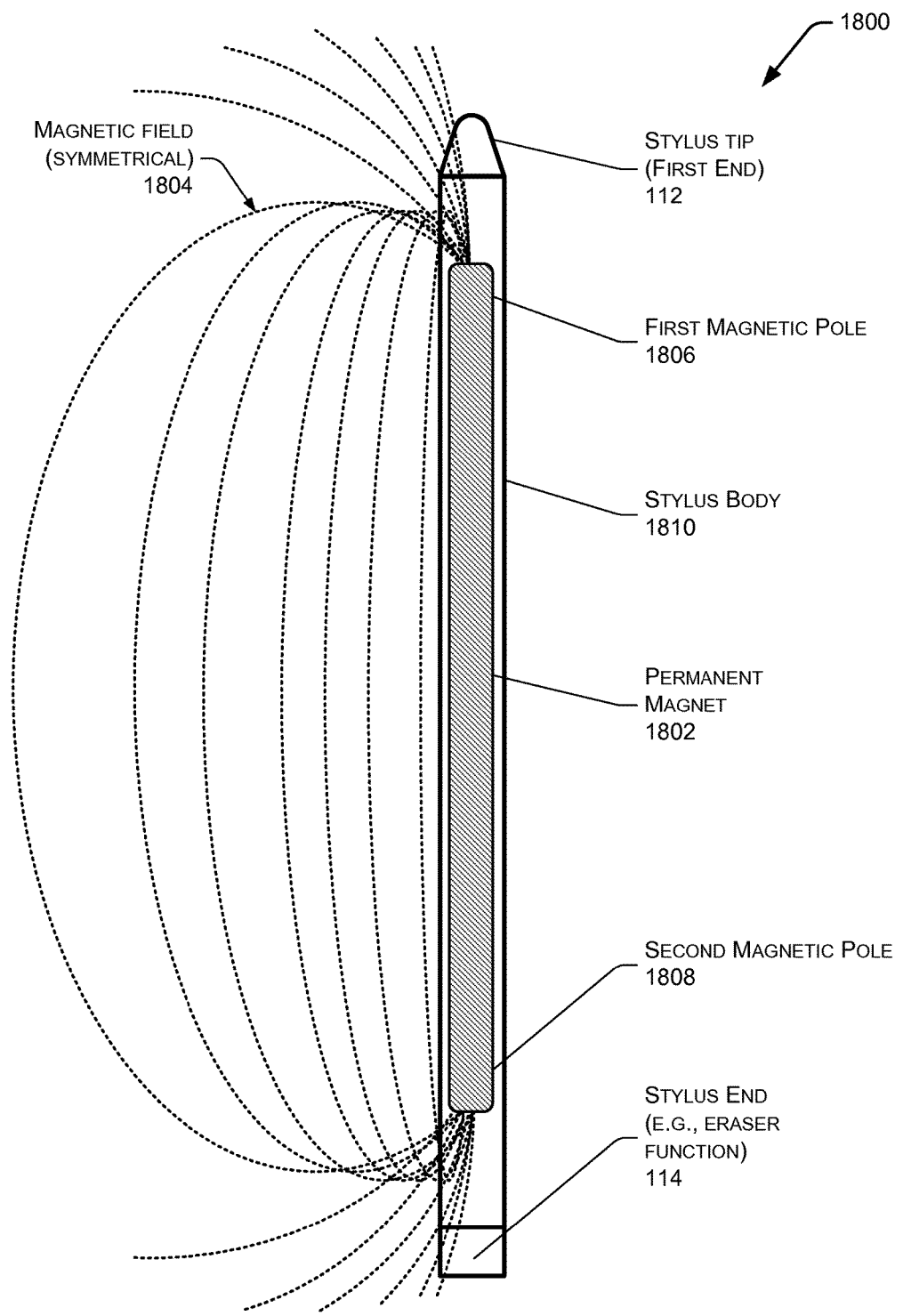
FIG. 18 is a cross section of an illustrative stylus comprising a permanent magnet.

FIG. 18 is a cross section of an illustrative magnetic stylus 1800 comprising a permanent magnet 1802. The permanent magnet 1802 is shown in a solid cylindrical form factor, with illustrated magnetic field lines 1804 radiating symmetrically therefrom and extending from a first magnetic pole 1806 to a second magnetic pole 1808. The permanent magnet 1802 is depicted encapsulated within a stylus body 1810. In other implementations, the permanent magnet 1802 may be disposed within a groove or affixed to the side of the stylus body 1810. The stylus body 1810 may comprise a non-ferrous material, for example plastic which provides no or minimal interference to the magnetic field. In the other implementations the stylus body 1810 may comprise other materials which provide known interactions with the magnetic field such as ferrous materials. In some implementations, the stylus 112 may incorporate one or more permanent magnets of the same or differing geometries and configured to generate a magnetic field of desired size and shape.

The input module 106 may be configured to recognize which end of the stylus is in use, and modify input accordingly. For example, input determined to be from the stylus tip 112 may be configured to initiate a handwriting function on the device 100, while input determined to be from the stylus end 114 may be configured to highlight text. In other implementations, it may be recognized when the stylus 110 is placed flat relative to the touch sensor, such as when the stylus 110 lies upon the touch sensor 102. In this orientation, the input module 106 may be configured to wipe or erase contents on the display 104.

In some implementations, the permanent magnet 1802 may also be configured to hold the stylus 110 to the electronic device 100 or an accessory such as a cover. Additionally, as described above, magnetic implements may embody a variety of form factors. For example, the magnetic implement may comprise a wrist band, ring worn around a finger, may be integrated with a glove for a user's hand, puck, and so forth. Furthermore, because the stylus itself contains no active parts production cost is relatively low cost and reliability is significantly improved.

Figure 19:
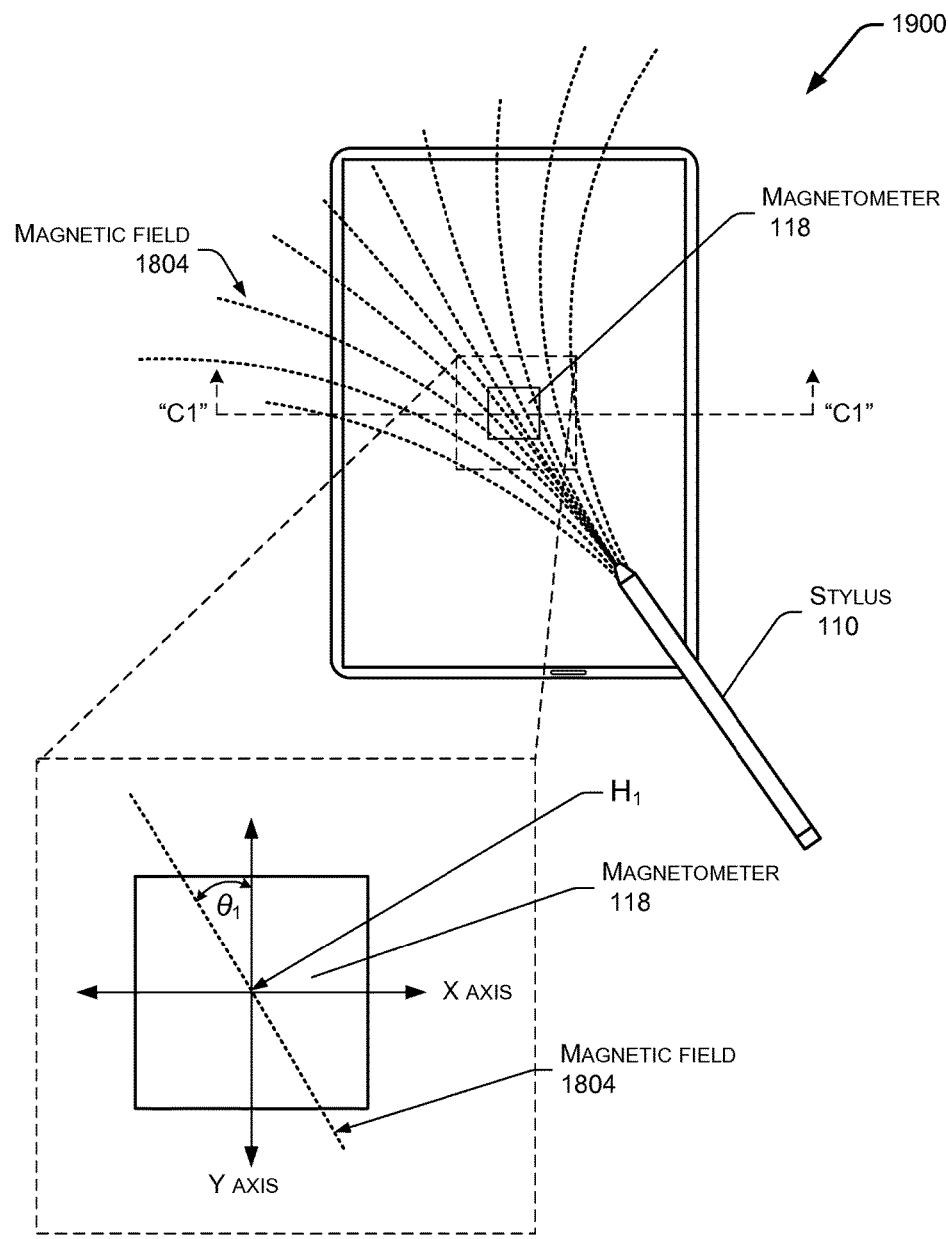
FIG. 19 is a plan view of the electronic device and a magnetometer detecting a relative angular bearing and a relative magnetic field strength of the magnetic field from a magnet within the stylus.

FIG. 19 is a plan view 1900 of the electronic device 100 and a magnetometer 118 sensing the magnetic implement. The magnetometer 118, or other magnetic field sensor allows for the detection and characterization of an impinging magnetic field. For example, the magnetometer 118 may determine a field strength, angular bearing, polarity of the magnetic field, and so forth. Because magnetic fields, particularly in the environment within which electronic devices operate, are predictable and well understood, it becomes possible to determine proximity and in some implementations, the position, orientation, and so forth of the magnetic implement.

As shown in this illustration, the stylus 110 is positioned above the surface of the device 100. Shown at approximately the center of the device 100 is the magnetometer 118, which may be disposed beneath the display 104. In other implementations, the magnetometer 118 may reside in other locations within or adjacent to the device.

The magnetometer 118 senses the magnetic field 1804 generated by the permanent magnet 1802 within the stylus 110, and is configured to characterize the magnetic field. An angle $\theta_1$ is depicted describing an angle between a field line of the magnetic field 1804 and the Y axis of the device. A single angle $\theta_1$ is shown here for clarity, but it is understood that several angular comparisons may be made within the magnetometer 118. By analyzing the angular variation and utilizing known characteristics about the permanent magnet 1802, the device 100 is able to determine an angular bearing to the source. For example, assume that the magnetometer 118 is configured to read out in degrees, with the 12 o'clock position being 0 degrees, and increasing in a clockwise fashion, device 100 may determine the stylus is located at an angular bearing of about 135 degrees relative to the magnetometer 118.

Furthermore, the magnetometer 118 may also determine a field strength measurement $H_1$ as shown. When compared to a known source such as the permanent magnet 1802 within the stylus 110, it becomes possible to estimate distance to a magnetic field source based at least in part upon the field strength.

The input module 106 may also use data from the magnetometer 118 to determine a field orientation. The orientation of a magnetic field may be considered the determination of which end of the magnet is the North pole and which is the South pole. This field orientation may be used to disambiguate the angular bearing (for example, determine the bearing is 135 and not 315 degrees), determine which end of the stylus 110 is proximate to the device, and so forth.

In some implementations, the input module 106 may provide a calibration routine whereby the user places the stylus in one or more known positions and/or orientations, and magnetometer 118 output is assessed. For example, the device 100 may be configured to calibrate field strength, position, and orientation information when the stylus 110 is docked with the device 100. This calibration may be useful to mitigate interference from other magnetic fields such as those generated by audio speakers, terrestrial magnetic field, adjacent electromagnetic sources, and so forth.

Figure 20:
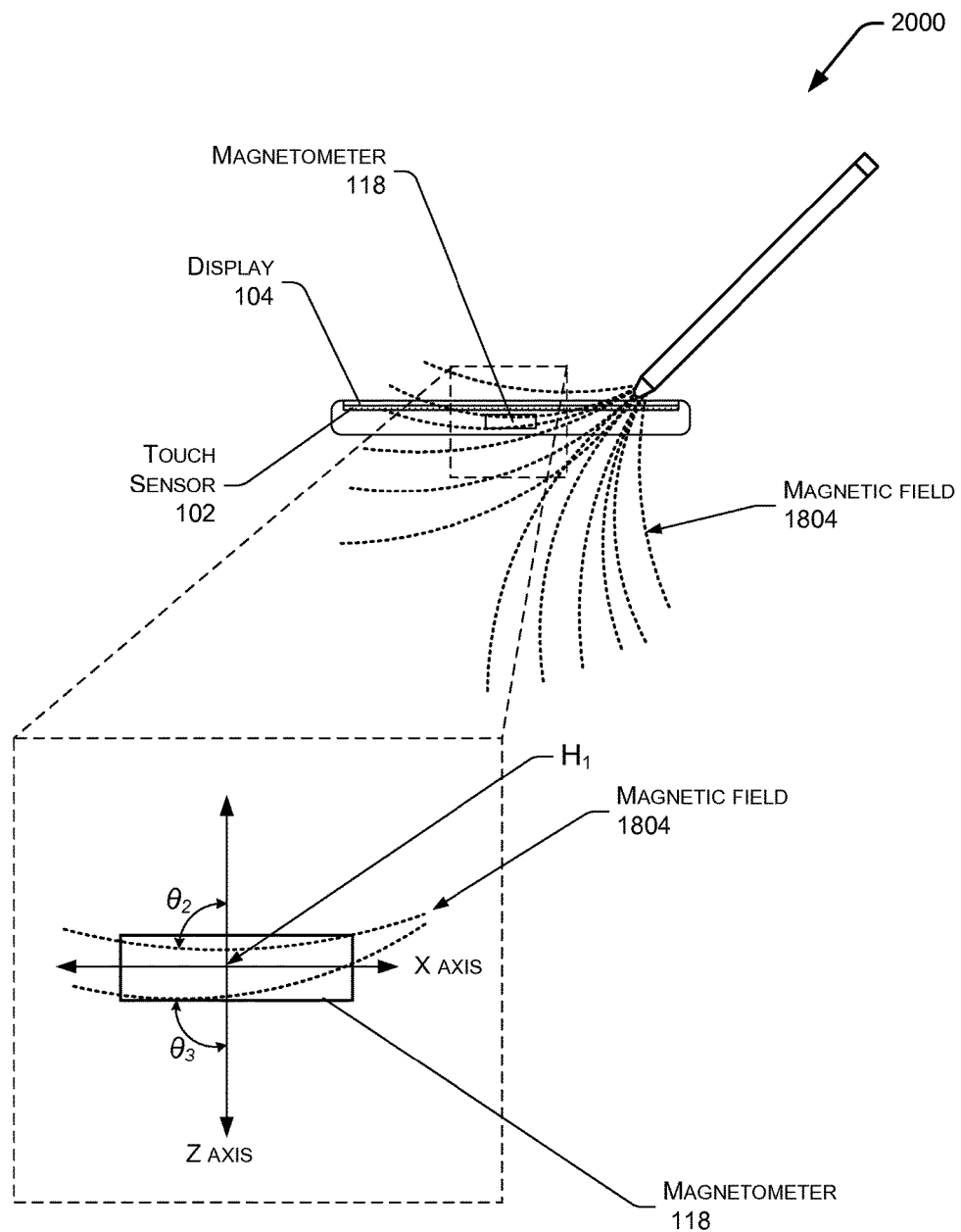
FIG. 20 is a cross section of the electronic device of FIG. 19.

FIG. 20 is a cross section 2000 of the electronic device 100 of FIG. 19. In this view along cross section line C1 of FIG. 18, the disposition of the magnetometer 118 beneath the display 104 as well as the impinging magnetic field lines 1804 is depicted. While the stylus 110 is shown touching the surface of the device 100, it is understood that the stylus is not required to be in contact with the touch sensor 102 or the device 100 for the magnetometer 118 to sense the impinging magnetic field. Because the magnetic field propagates through space, near-touch input is possible.

As described above it is possible to determine an angular bearing of the magnetic field source, such as the permanent magnet 1802 within the stylus 110, relative to the magnetometer 118. In a similar fashion it is possible as shown here to measure angles of an impinging magnetic field 1804 to determine a tilt angle of the magnetic field source. Due to the closed loop nature of magnetic fields which extend unbroken from a first pole to a second pole, better results are obtained from using longer magnets. For example, where the permanent magnet 1802 extends substantially along the stylus body 1812, better angular resolution is possible compared to a short magnet placed within the stylus tip 112. Also, a longer magnet reduces field flipping or ambiguity compared to a shorter magnet. Furthermore, distance to the object along the angular bearing may be determined by analyzing the strength of the magnetic field source at the magnetometer 118.

As shown here, the magnetic field 1804 impinges on the magnetometer 118 and angles $\theta_2$, and $\theta_3$ are described between the magnetic field lines 1804 and a defined reference plane. By comparing the field strength to estimate distance and by measuring the angles, it is thus possible to calculate a tilt angle of the stylus relative to the reference plane defined within the magnetometer 118, and thus the device 100. Additionally, as mentioned above, by determining the polarity of the magnetic field, it is possible to determine which end of the stylus is proximate to the device.

Figure 21:
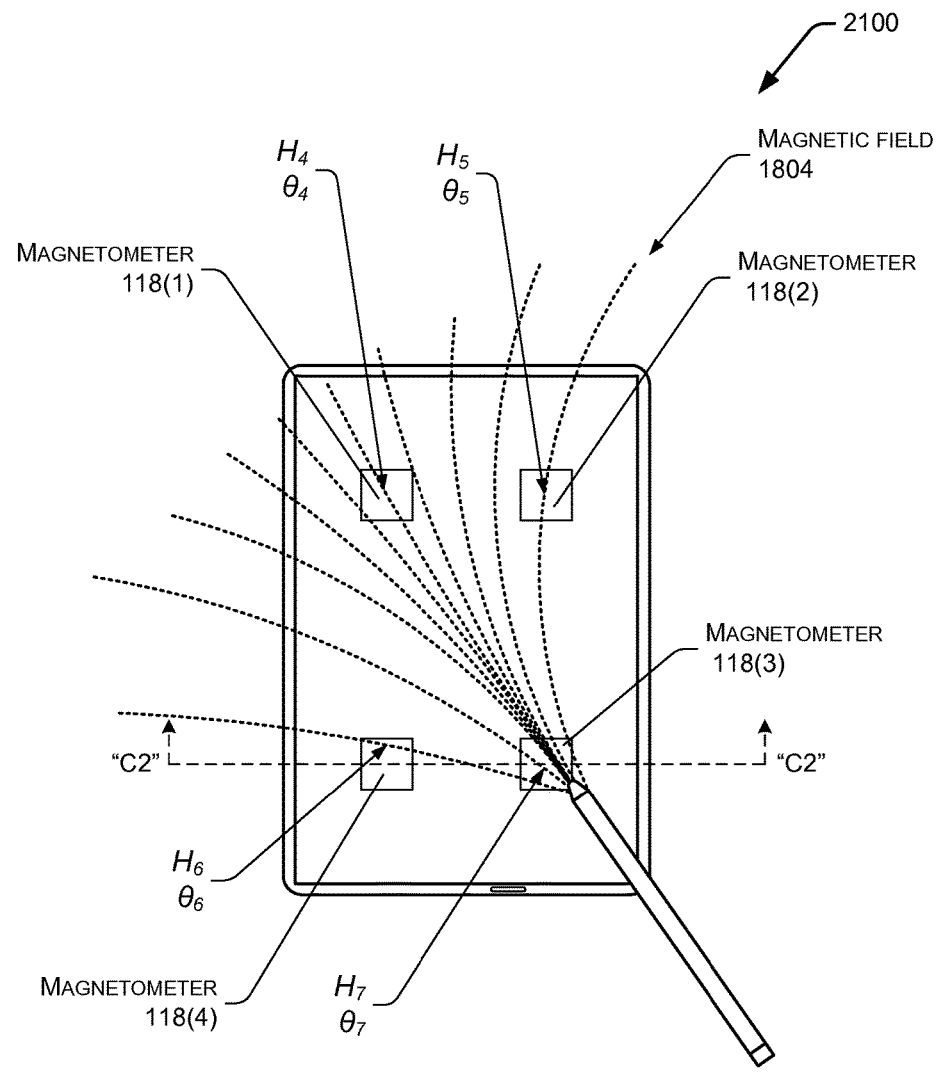
FIG. 21 is a plan view of the electronic device and plurality of magnetometers, each of the magnetometers detecting a relative angular bearing and a relative magnetic field strength of the magnet within the stylus.

Additional magnetometers may be used to provide more accurate position information. FIG. 21 is a plan view 2100 of the electronic device 100 and plurality of magnetometers. In this illustration four magnetometers 118(1)-(4) are depicted arranged beneath the touch sensor 104. As described above, each of the magnetometers 118 may be configured to detect a relative angular bearing of the magnet within the stylus and a relative magnetic field strength. By providing two or more magnetometers within the device, position resolution may be improved, as well as resistance to external magnetic noise sources.

In addition to determining location based upon the angle of impinging magnetic fields, field strength H may be used to determine approximate location. For example, given the position of the stylus 110 and corresponding permanent magnet 1802 adjacent to magnetometer 118(3), close to magnetometer 118(4), and most distant from magnetometer 118(1), based upon the field strength the position of the magnetic field source may be triangulated.

Figure 22:
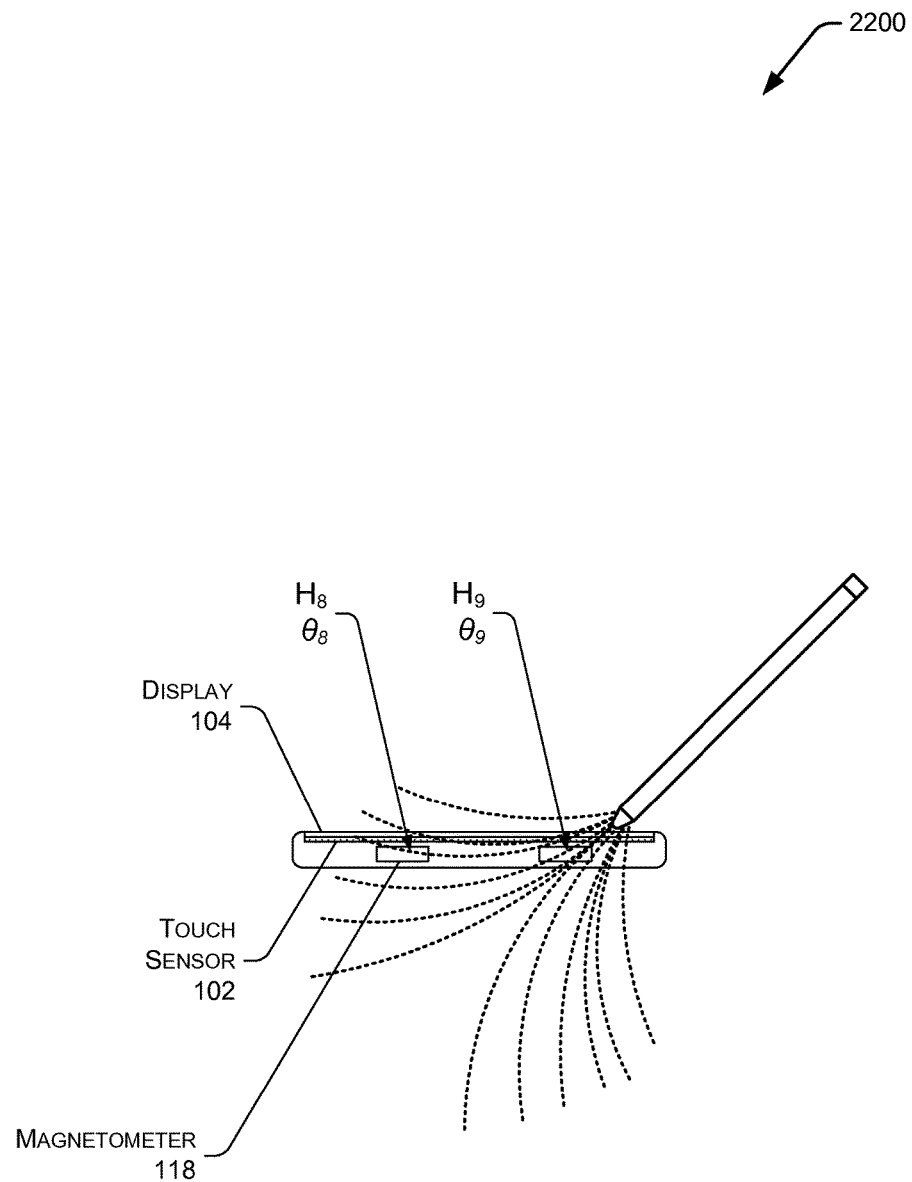
FIG. 22 is a cross section of the electronic device of FIG. 21.

FIG. 22 is a cross section 2200 of the electronic device of FIG. 21 along line C2 of FIG. 21. Similar to that described above with respect to FIG. 20, the magnetic fields 1804 impinging on the magnetometers may be used to determine the tilt angle of the stylus. The placement of magnetometers throughout a working input area of the device 100 allows for improved determination of tilt angle.

Furthermore, as mentioned above, by observing the polarity of the magnetic field, it is possible to determine accurately which end of the stylus 110 is proximate to the device. This is particularly useful in situations where the touch sensor is not able to generate force data, such as with a projected capacitance touch sensor. By monitoring the magnetic field orientation, determination of whether a stylus tip 112 or a stylus end 114 is closest to the touch sensor is readily accomplished with a stylus having a permanent magnet within.

Figure 23:
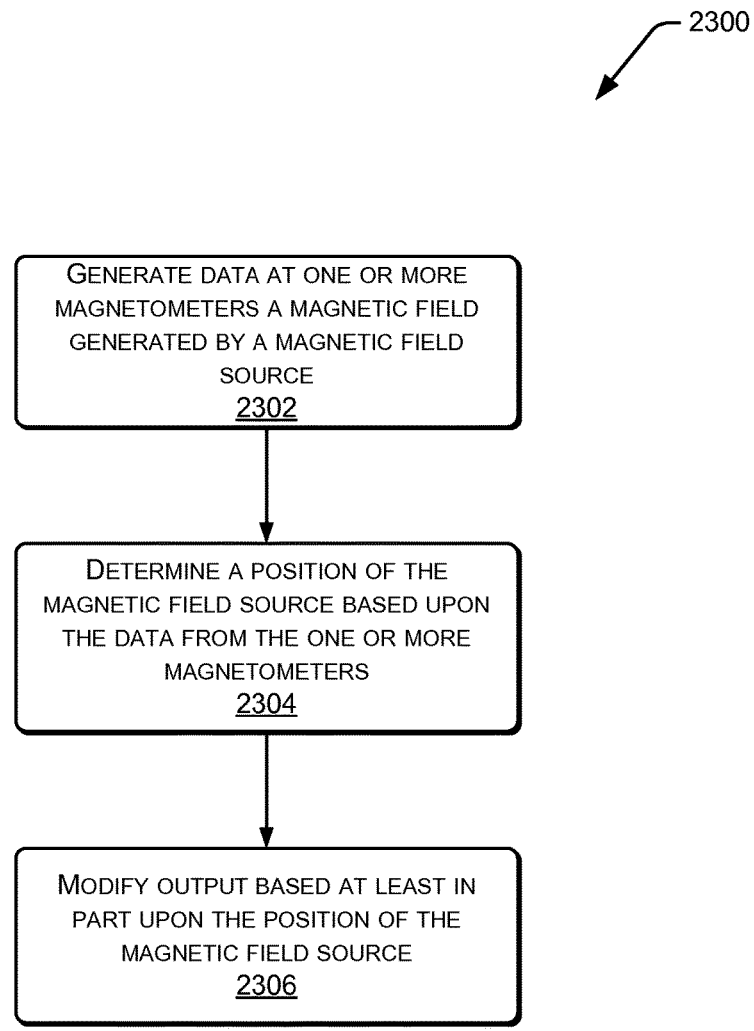
FIG. 23 is an illustrative process of determining a position of a magnetic field source based upon data from one or more magnetometers.

FIG. 23 is an illustrative process 2300 of determining a position of a magnetic field source based upon data from one or more magnetometers. This allows for near-touch sensing and enhances the performance of touch sensors.

At 2302, one or more magnetometers detect a magnetic field generated by a magnetic field source and generate data about the field. At 2304, an input module 106 determines a position of the magnetic field source based upon the data from the one or more magnetometers. For example, as described above with regards to FIGS. 19-22, angular bearing, field strength, polarity, and so forth may be used to determine a location of the permanent magnet.

At 2306, output is modified at least in part based upon the position of the magnetic field source. As described above, the input generated by the magnetic field source may be near-touch. For example, the user may wave the magnetic stylus above the device 100 to initiate an action, such as changing a displayed page of an eBook. Or in another example, the tilt angle of the stylus may control how fast the display 104 scrolls pages.

Figure 24:
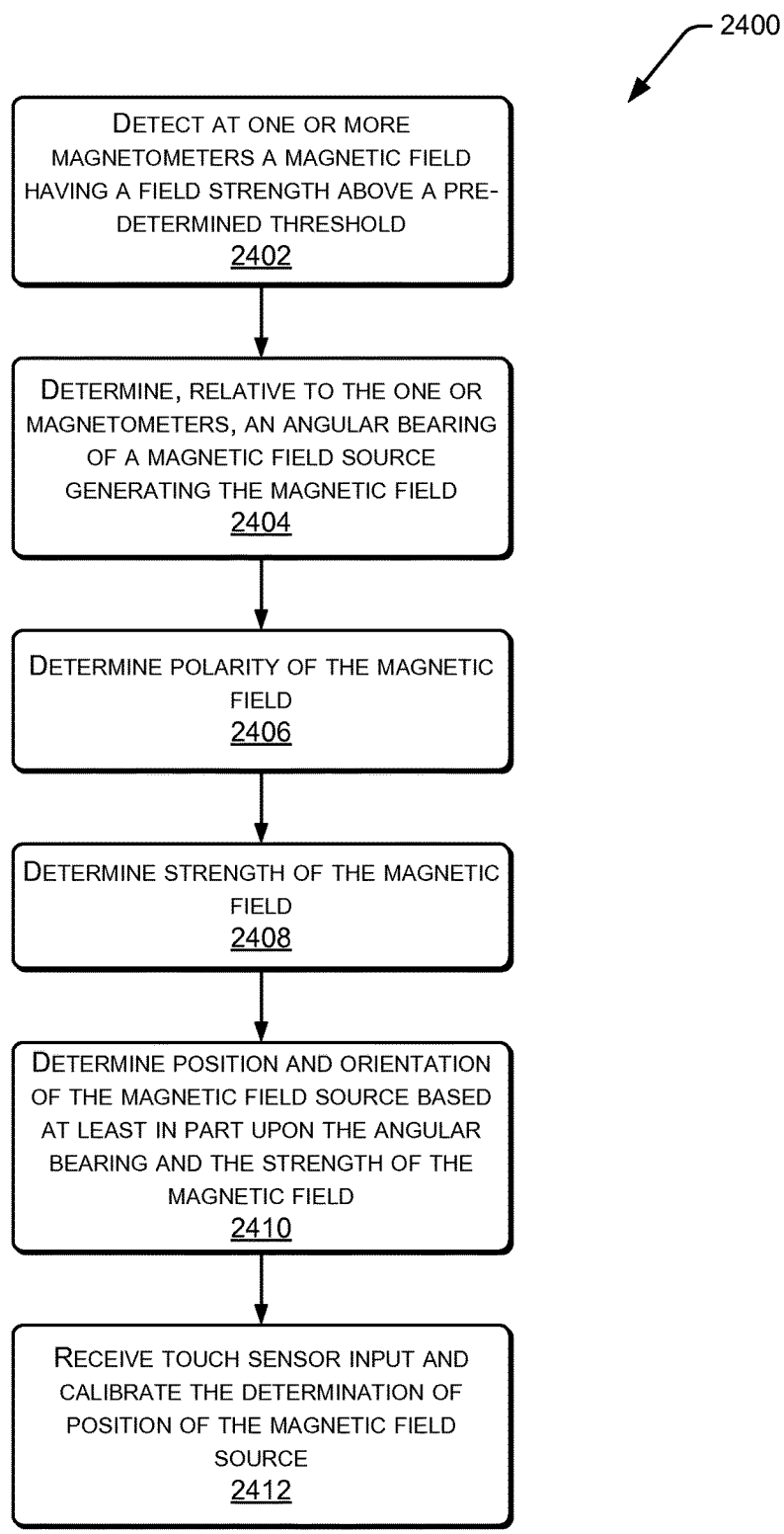
FIG. 24 is an illustrative process of further determining the position and orientation of a magnetic field source based upon angular bearing, magnetic field strength, or both, to one or more magnetometers.

FIG. 24 is an illustrative process 2400 of further determining the position and orientation of a magnetic field source. At 2402, one or more magnetometers detect a magnetic field having a strength above a pre-determined threshold. This pre-determined threshold may be configured or calibrated to ignore the terrestrial magnetic field, or dynamically adjusted such as to adjust for magnetic fields generated by audio speakers within the device 100. This calibration may include the use of offset values and scaling factors to adjust for factors such as manufacturing variances, aging of the device, varying temperature, ambient magnetic fields, and so forth.

At 2404, the input module 106 determines an angular bearing relative to the one or more magnetometers of a magnetic field source generating the magnetic field. For example, as described above the input module 106 may observe the angle with which the magnetic fields impinge upon the magnetometers and determine the angular bearing.

At 2406 a polarity or orientation of the magnetic field is determined. As described above, this orientation may allow for disambiguation of the angular bearing, provide information as to what part of the magnetic implement is proximate to the device, and so forth.

At 2408, a field strength of the magnetic field is determined at one or more of the magnetometers. At 2410, the input module 106 determines position and orientation of the magnetic field source based at least in part upon the angular bearing, the field strength, or both.

At 2412, the input module 106 receives input from the touch sensor 102 and calibrates the determination of the position of the magnetic field source. For example, when the stylus tip 112 of the magnetic stylus touches the touch sensor 102, the device 100 now has an accurate known location of the touch. This known location may be used to adjust the determination of the position via the magnetometers to improve accuracy.

Figure 25:
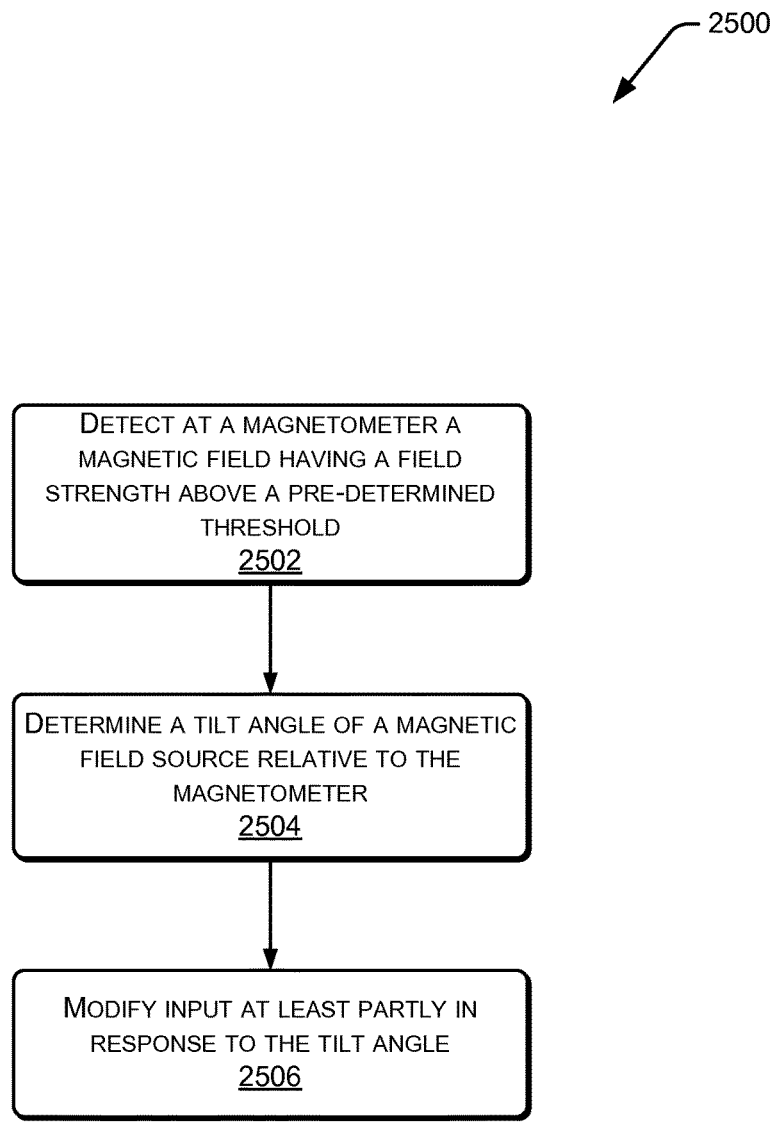
FIG. 25 is an illustrative process of further determining a tilt angle of a magnetic field source relative to the magnetometer.

FIG. 25 is an illustrative process 2500 of determining a tilt angle of a magnetic field source relative to the magnetometer. At 2502 one or more magnetometers detect a magnetic field having a strength above a pre-determined threshold. At 2504, one or more magnetometers measure impinging magnetic fields generated by the magnetic field source, such as the magnetic stylus. By measuring the angle of impingement and by comparing with the detected field strength or a known contact point from the touch sensor 102, a tilt angle of the magnetic implement relative to the device 100 is determined.

At 2506, the input module 106 modifies input at least partly in response to the tilt angle. For example, when the user tilts the stylus at an extreme angle, the input may be configured to highlight text rather than enter text.

Depending upon the capabilities of the touch sensor 102, is may be difficult or impossible to characterize a touch. For example, when the touch sensor 102 does not support force sensing, use of a force distribution is unavailable to distinguish a tip of a stylus from a blunt end of the stylus. By using input from both the touch sensor 102 and the magnetometers 118, it becomes possible to more readily distinguish objects which are in contact with the touch sensor 102, particularly magnetic implements compared to non-magnetic implements.

Figure 26:
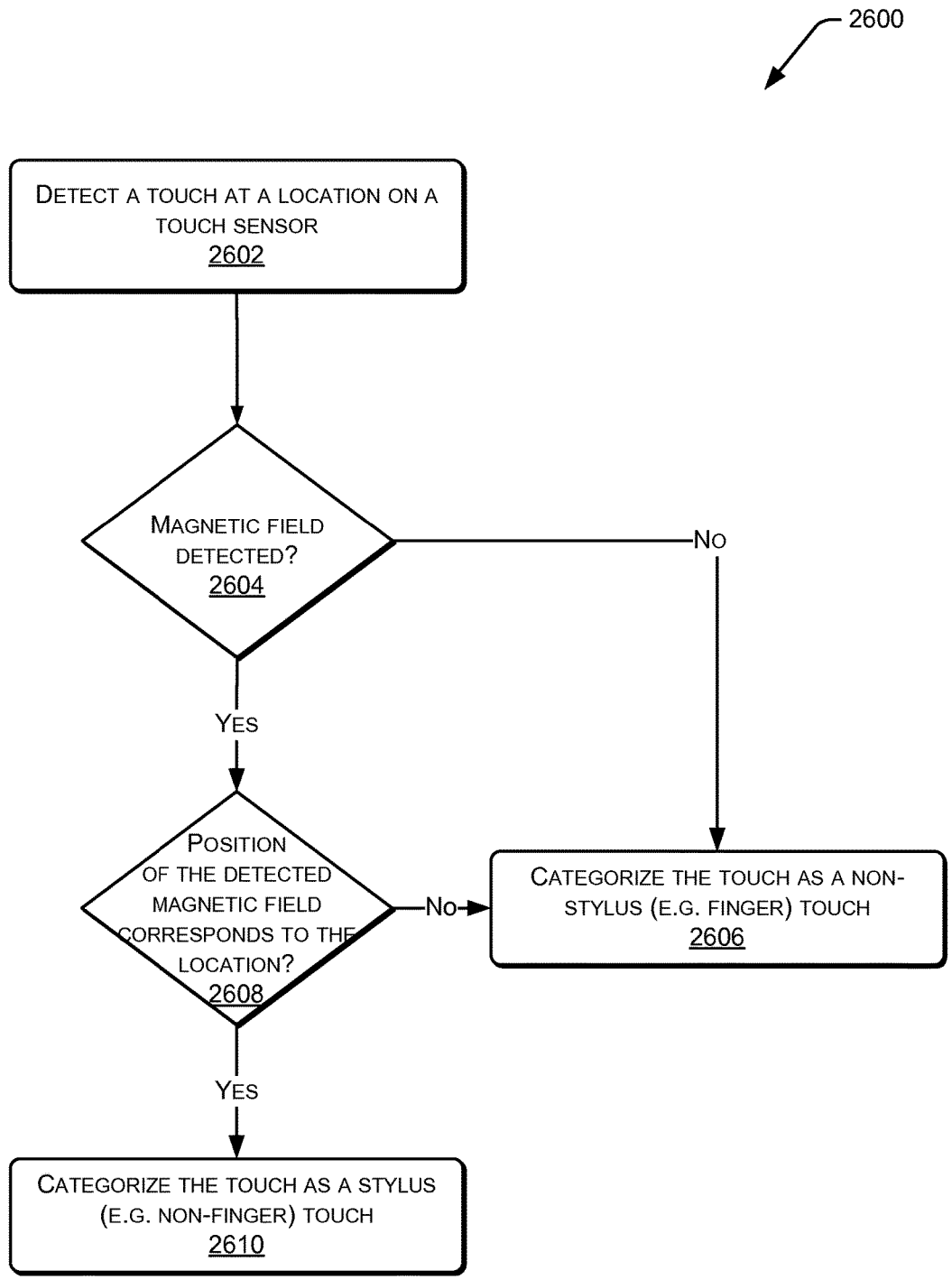
FIG. 26 is an illustrative process of distinguishing between a non-stylus (e.g. a finger) touch and a stylus (e.g. non-finger) touch based upon the presence or absence of a magnetic field source at the location of a touch on a touch sensor.

FIG. 26 is an illustrative process 2600 of distinguishing between a non-stylus (e.g. a finger) touch and a stylus (e.g. non-finger) touch based upon the presence or absence of a magnetic field source at the location of the touch on a touch sensor. At 2602, the input module 106 detects a touch at a location on the touch sensor 102. At 2604, the input module 106 determines whether a magnetic field is detected by the one or more magnetometers 118. When at 2604 no magnetic field is detected, at 2606 the input module categorizes the touch as a non-stylus or non-magnetic implement touch. For example, when the magnetic implement is a magnetic stylus, a touch without a magnetic field being present must not be the magnetic stylus, and is thus something else.

When at 2604 the input module 106 determines that a magnetic field is detected by the one or more magnetometers 118, the input module 106 module may further compare position information. At 2608, when the position of the detected magnetic field corresponds to the location of the touch upon the touch sensor 102, the process continues to 2610. At 2610, the input module 106 categorizes the touch as a stylus (or magnetic implement) touch.

Returning to determination 2608, when the position of the detected magnetic field does not correspond to the location of the touch upon the touch sensor 102, the process continues to 2606, where the touch is categorized as a non-stylus (e.g., a finger).

Figure 27:
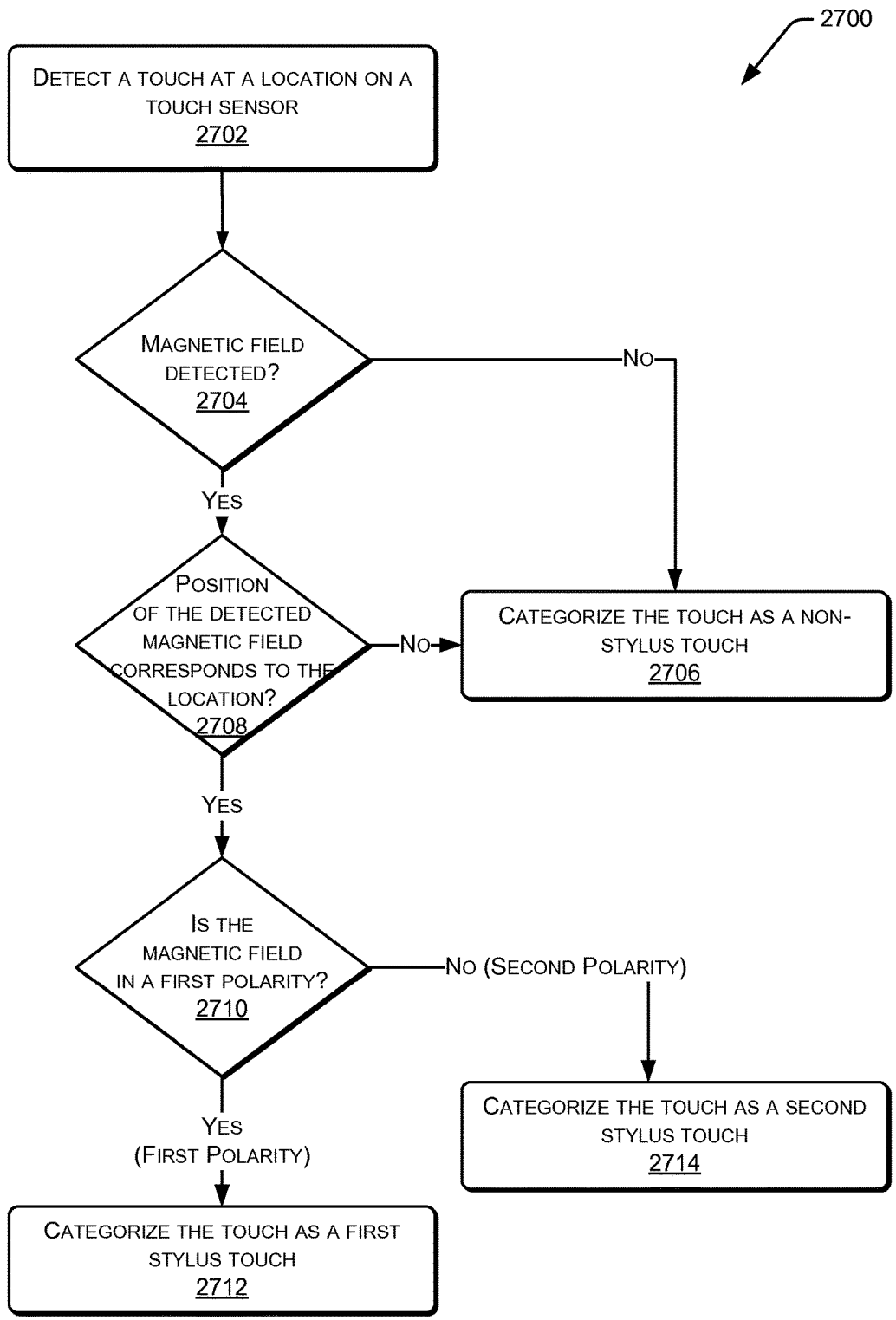
FIG. 27 is an illustrative process of distinguishing between a non-stylus touch and a stylus touch, which end of a magnetic stylus is in contact with a touch sensor based at least in part upon the magnetic field orientation.

FIG. 27 is an illustrative process 2700 of distinguishing between a non-stylus touch and a or stylus touch based upon the presence or absence of a magnetic field source at the location of a touch on a touch sensor and determining which end of a magnetic stylus is contact based at least in part upon the magnetic field orientation.

At 2702, the input module 106 detects a touch at a location on the touch sensor 102. At 2704, the input module 106 determines whether a magnetic field is detected by the one or more magnetometers 118. When at 2704 no magnetic field is detected, at 2706 the input module categorizes the touch as a non-stylus or non-magnetic implement touch.

When at 2704 the input module 106 determines that a magnetic field is detected by the one or more magnetometers 118, the input module 106 module may further compare position information. At 2708, when the position of the detected magnetic field corresponds to the location of the touch upon the touch sensor 102, the process continues to 2710. When at 2708 the position of the detected magnetic field does not correspond to the location of the touch upon the touch sensor 102, the process proceeds to 2706 and categorizes the touch as a non-stylus touch.

At 2710, the input module determines the polarity or orientation of the magnetic field. When at 2710 the magnetic field is in a first polarity, the process proceeds to 2712 and categorizes the touch as a first stylus touch. For example, the north magnetic pole of the stylus may be associated with the stylus tip 112, while the south magnetic pole may be associated with the stylus end 114. By determining the field polarity it is thus possible to distinguish which end of the stylus is proximate to the magnetometers 118, and thus the device 100. When at 2710 the magnetic field is in a second polarity, the process proceeds to 2714 and categorizes the touch as a second stylus touch.

It may be useful to determine which end of the magnetic implement is proximate to the device, without determining the position of the magnetic implement via magnetometer. For example, the device 100 may have a touch sensor and single magnetic field sensor unable to determine angular bearing.

Figure 28:
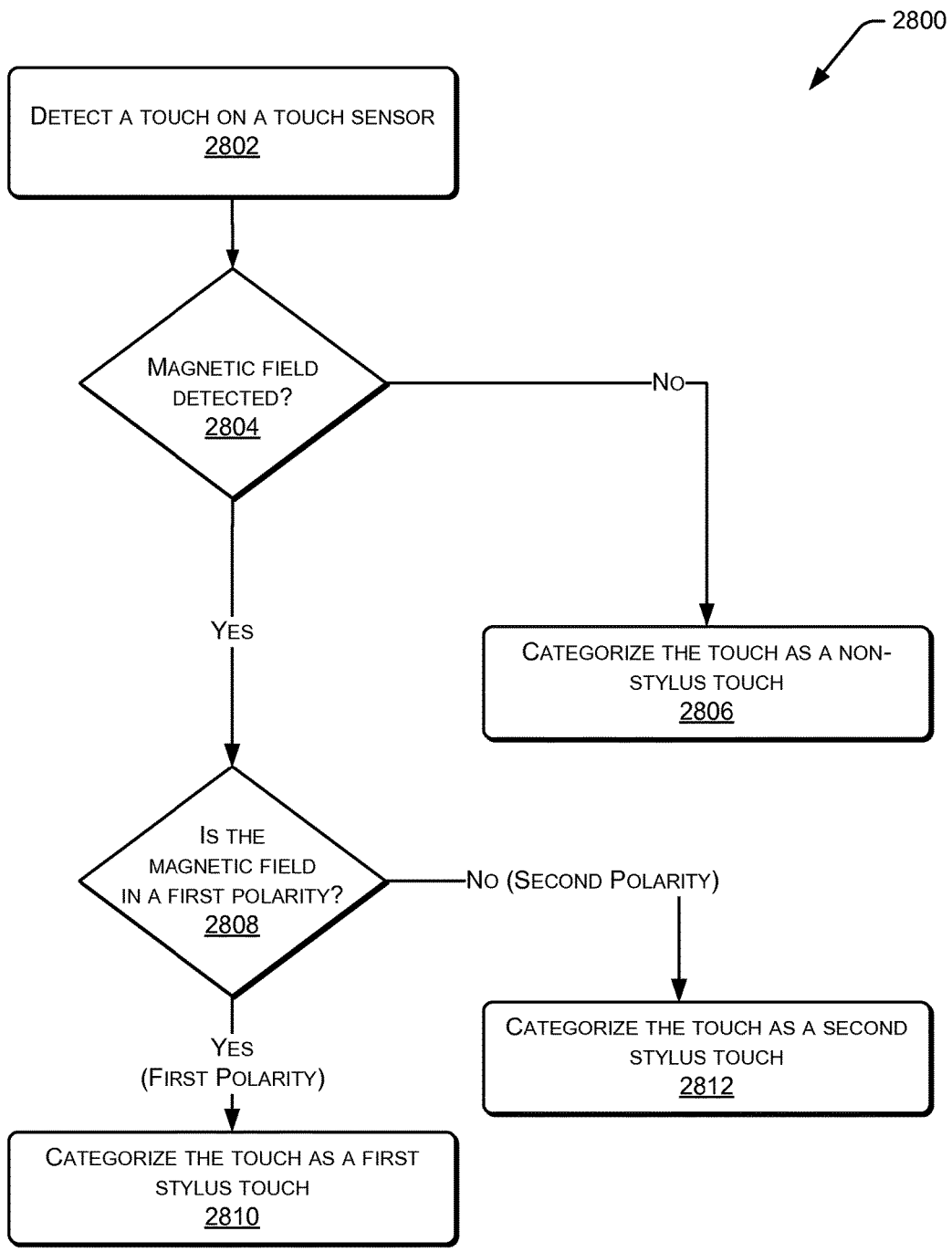
FIG. 28 is an illustrative process of distinguishing between a non-stylus touch and a stylus touch based upon the presence or absence of a magnetic field source and determining which end of a magnetic stylus is in contact based at least in part upon the magnetic field orientation.

FIG. 28 is an illustrative process 2800 of distinguishing between a non-stylus touch and a stylus touch based upon the presence or absence of a magnetic field source and determining which end of a magnetic stylus is contact based at least in part upon the magnetic field orientation.

At 2802, the input module 106 detects a touch on the touch sensor 102. At 2804, the input module 106 determines whether a magnetic field is detected by the one or more magnetometers 118. When at 2804 no magnetic field is detected, at 2806 the input module 106 categorizes the touch as a non-stylus or non-magnetic implement touch.

When at 2804 a magnetic field is detected, the process continues to 2808. At 2808, the input module determines the polarity or orientation of the magnetic field. When at 2808 the magnetic field is in a first polarity, the process proceeds to 2810 and categorizes the touch as a first stylus touch. When at 2808 the magnetic field is in a second polarity, the process proceeds to 2812 and categorizes the touch as a second stylus touch.

The input module 106 is now able to more readily determine which end of a magnetic implement is generating the touch. For example, when the field is oriented a first polarity, the input module 106 can determine that the touch corresponds to the stylus tip 112, while the second polarity indicates the stylus end 114 is closest to the device 100. Likewise, when a touch is sensed with no magnetic field present, the touch is not from the magnetic implement.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An electronic device comprising:
   a processor;
   a memory coupled to the processor;
   an interpolating force-sensing resistance (IFSR) touch sensor coupled to the processor;
   an input module stored in the memory and configured to execute on the processor to:
   detect a touch on the IFSR touch sensor;
   determine a touch profile of the touch;
   characterize, based at least in part upon the touch profile, the touch as a touch provided by a stylus or a touch provided by a finger;
   cause the IFSR touch sensor to scan at a first scan rate and a first scan resolution at least partly in response to characterizing the touch as the stylus; and
   cause the IFSR touch sensor to scan at a second scan rate and a second scan resolution at least partly in response to characterizing the touch as the finger, the second scan rate being lower than the first scan rate, the second scan resolution being less than the first scan resolution.

2. The device of claim 1, wherein the touch profile comprises a temporal force distribution of applied force over a period of time.

3. The device of claim 1, wherein the touch profile comprises a plurality of points of applied force distributed across one or more spatial dimensions.

4. The device of claim 1, wherein the touch profile comprises a map of force applied over an area.

5. The device of claim 1, wherein the input module is further configured to execute on the processor to characterize the touch by comparing the touch profile with a previously characterized library of touch profiles.

6. The device of claim 5, wherein the input module is further configured to execute on the processor to designate the touch as an intentional input or an unintentional input.

7. The device of claim 6, wherein the input module is further configured to execute on the processor to characterize the touch as a palm.

8. The device of claim 1, wherein the input module is further configured to execute on the processor to modify input from the IFSR touch sensor in a pre-determined fashion at least partly in response to determining a magnitude of force of the touch.

9. A device comprising:
   an interpolating force-sensing resistance (IFSR) touch sensor; and
   an input module configured to:
   detect a touch on the IFSR touch sensor;
   determine a touch profile of the touch;
   characterize, based at least in part upon the touch profile, the touch as a stylus touch or a non-stylus touch;
   cause the IFSR touch sensor to scan at a first scan rate and a first scan resolution at least partly in response to characterizing the touch as the stylus touch; and
   cause the IFSR touch sensor to scan at a second scan rate and a second scan resolution at least partly in response to characterizing the touch as the non-stylus touch, the second scan rate being lower than the first scan rate, the second scan resolution being less than the first scan resolution.

10. The device of claim 9, wherein the determining the touch profile comprises measuring a force input over a period of time at one or more sensing elements.

11. The device of claim 9, wherein the input module maintains the characterization while the touch moves on the IFSR touch sensor.

12. A device comprising:
   a touch sensor including sensels; and
   an input module configured to:
   detect a first touch on the touch sensor;
   at least partly in response to the first touch, designate an area on the touch sensor associated with the first touch;
   determine that a difference between a first force measured at a first sensel and a second force measured at a second sensel is greater than a threshold amount;
   characterize the first touch as a touch of a first type based at least in part on the difference being greater than the threshold amount;
   detect a second touch within the area; and
   apply, based on the second touch being detected within the area, a biasing factor to the second touch, the biasing factor increasing a likelihood that the second touch will be characterized as a touch of the first type; and characterize the second touch using the biasing factor.

13. The device of claim 12, wherein the input module is further configured to decrease a value of the biasing factor over a pre-determined period of time.

14. The device of claim 12, wherein the touch sensor comprises an interpolating force-sensing resistance (IFSR) sensor or a capacitive touch sensor.

15. The device of claim 12, wherein the touch of the first type is a stylus type of touch or a non-stylus type of touch.

16. The device of claim 12, wherein the characterizing of the first touch is based at least in part on a touch profile of the first touch.

17. The device of claim 16, wherein the touch profile comprises a temporal force distribution of applied force over a period of time.

18. The device of claim 16, wherein the touch profile comprises a map of a plurality of contact points.

19. A device comprising:
a touch sensor including sensels; and
an input module configured to:
store a first touch detection threshold representing a threshold amount of force at which contact on the touch sensor is to be deemed a touch;
detect an object contacting the touch sensor based at least in part on detecting a first force at a first sensel of the sensels;
determine an amount of force on the touch sensor from the object contacting the touch sensor;
determine that the amount of force is greater than the threshold amount of force;
designate the contacting of the object on the touch sensor as a touch;
detect motion of the touch on the touch sensor based at least in part on detection of a second force at a second sensel of the sensels and a reduction of the first force at the first sensel;
modify the first touch detection threshold to a second touch detection threshold for the touch such that the threshold amount of force is at least one of increased or decreased during the motion of the touch on the touch sensor; and
modify the second touch detection threshold to the first touch detection threshold or another touch detection threshold at least partly in response to cessation of the motion.

20. The device of claim 12, wherein the touch of the first type comprises an intentional touch or a non-intentional touch.

21. The device of claim 9, wherein:
causing the IFSR touch sensor to scan at the first scan rate comprises instructing the IFSR touch sensor to perform a first number of scans over a period of time; and
causing the IFSR touch sensor to scan at the second scan rate comprises instructing the IFSR touch sensor to perform a second number of scans over the period of time, the second number of scans being fewer than the first number of scans.

22. The device of claim 9, wherein:
causing the IFSR touch sensor to scan at the first scan resolution comprises instructing the IFSR touch sensor to scan a first number of sensing elements for one or more touches; and
causing the IFSR touch sensor to scan at the second scan resolution comprises instructing the IFSR touch sensor to scan a second number of sensing elements for the one or more touches, the second number of sensing elements being fewer than the first number of sensing elements.

23. The device of claim 12, the input module further configured to:
determine that the difference between the first force measured at the first sensel and the second force measured at the second sensel is less than the threshold amount; and
characterize the first touch as a touch of a second type based at least in part on the difference being less than the threshold amount.

* * * * *